Feb. 3, 1942.  H. T. KUCERA  2,271,651
HEAT CONTROL APPARATUS
Filed Dec. 28, 1935   17 Sheets-Sheet 1

Inventor,
Henry T. Kucera
By Thiess, Olah & Mecklenburg
Attys

Feb. 3, 1942.  H. T. KUCERA  2,271,651
HEAT CONTROL APPARATUS
Filed Dec. 28, 1935  17 Sheets-Sheet 2
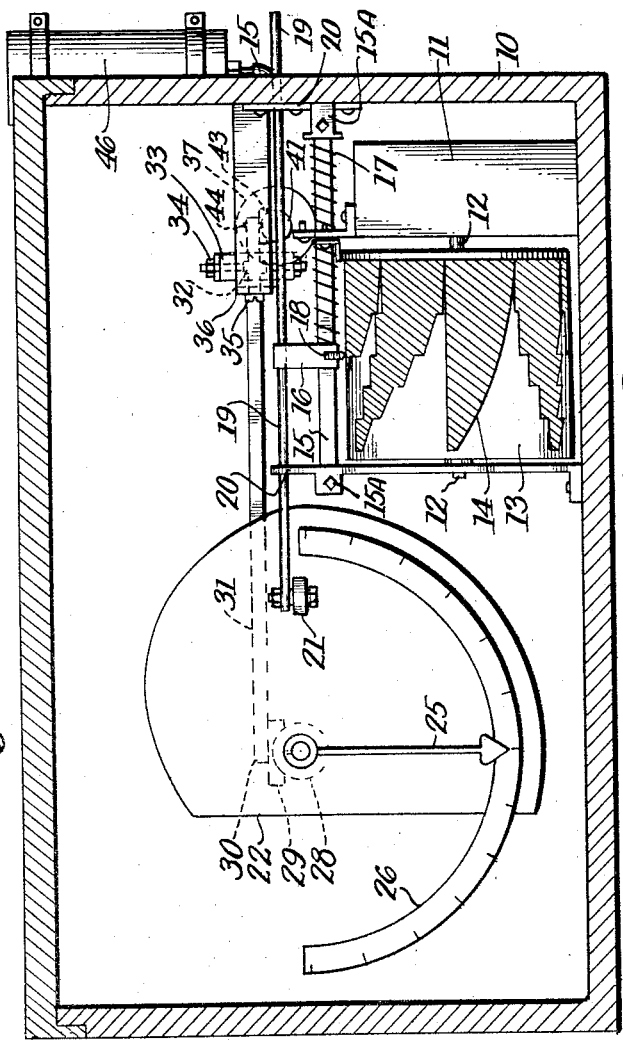
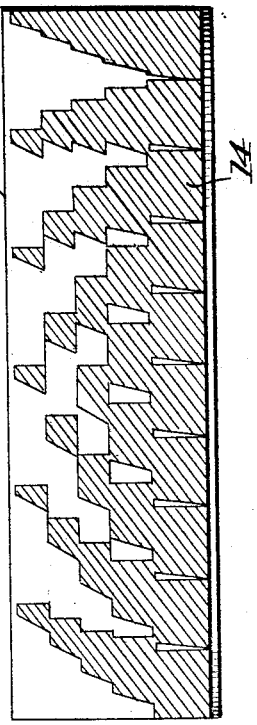
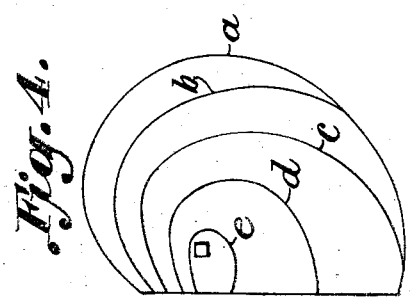
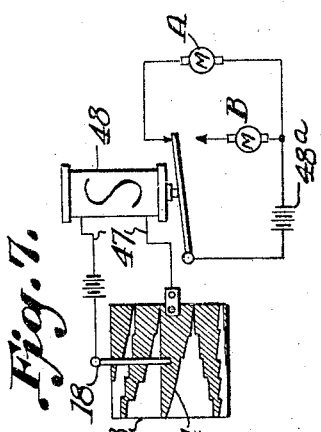
Inventor,
Henry T. Kucera
By: Thiess, Olson & Mecklenburger
Attys.

Feb. 3, 1942. H. T. KUCERA 2,271,651
HEAT CONTROL APPARATUS
Filed Dec. 28, 1935 17 Sheets-Sheet 3
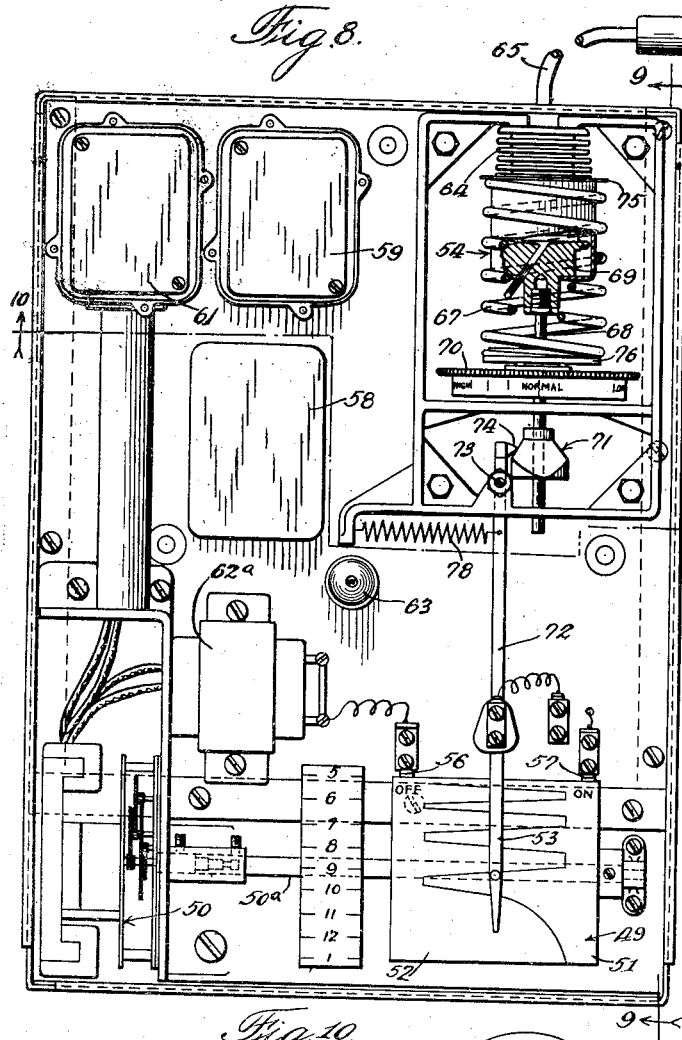
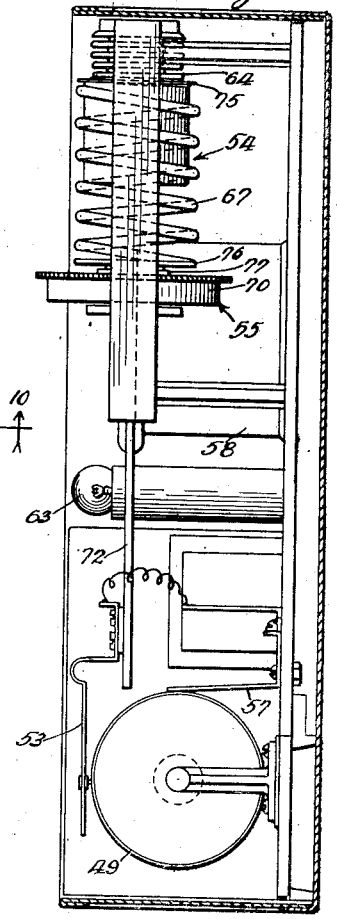
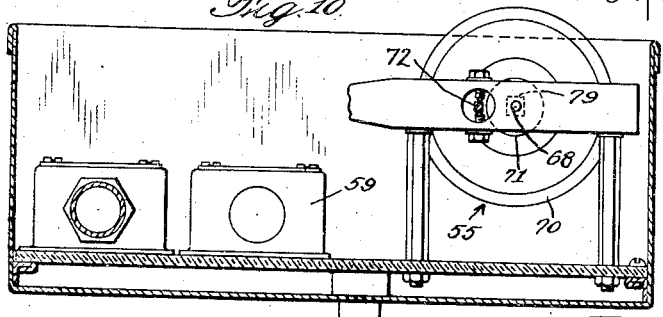
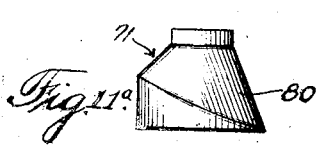
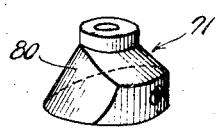

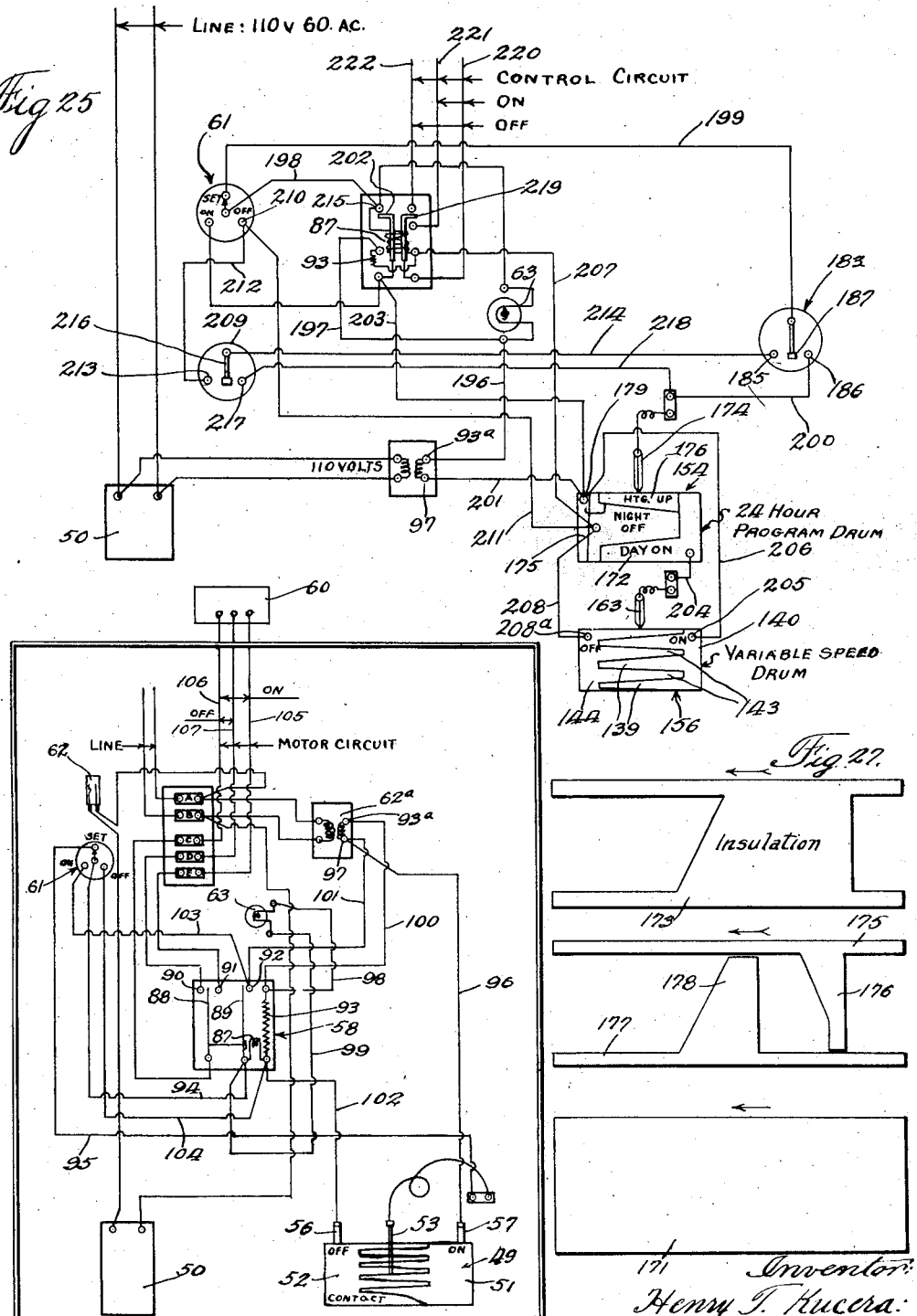

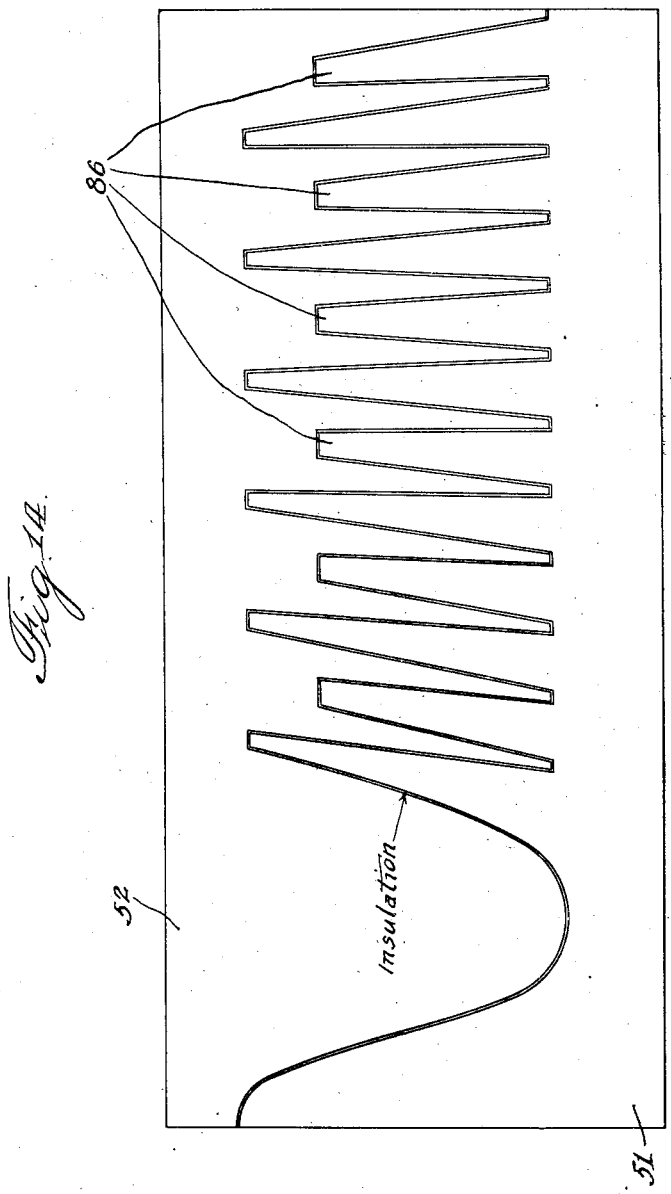

Feb. 3, 1942.     H. T. KUCERA     2,271,651
HEAT CONTROL APPARATUS
Filed Dec. 28, 1935     17 Sheets-Sheet 6

Inventor
Henry T. Kucera
By Jones, Addington, Ames & Seibold
Attys.

Feb. 3, 1942. H. T. KUCERA 2,271,651
HEAT CONTROL APPARATUS
Filed Dec. 28, 1935 17 Sheets-Sheet 8

Inventor:
Henry T. Kucera.
By: Jones, Addington, Ames & Seibel,
Attys.

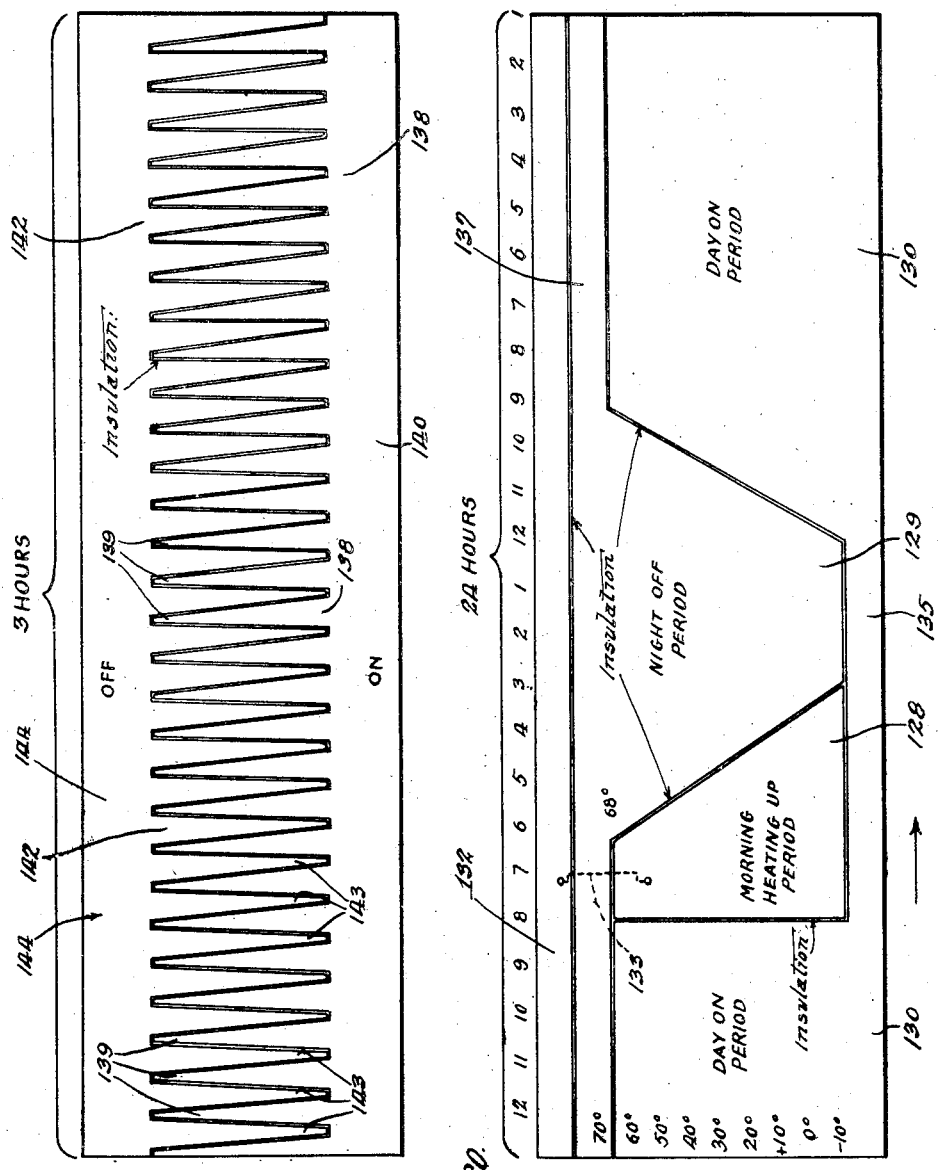

Feb. 3, 1942.     H. T. KUCERA     2,271,651
HEAT CONTROL APPARATUS
Filed Dec. 28, 1935     17 Sheets-Sheet 10

Feb. 3, 1942. H. T. KUCERA 2,271,651
HEAT CONTROL APPARATUS
Filed Dec. 28, 1935 17 Sheets-Sheet 11

Inventor:
Henry T. Kucera
By Jones, Addington, Ames & Seibold
Attys

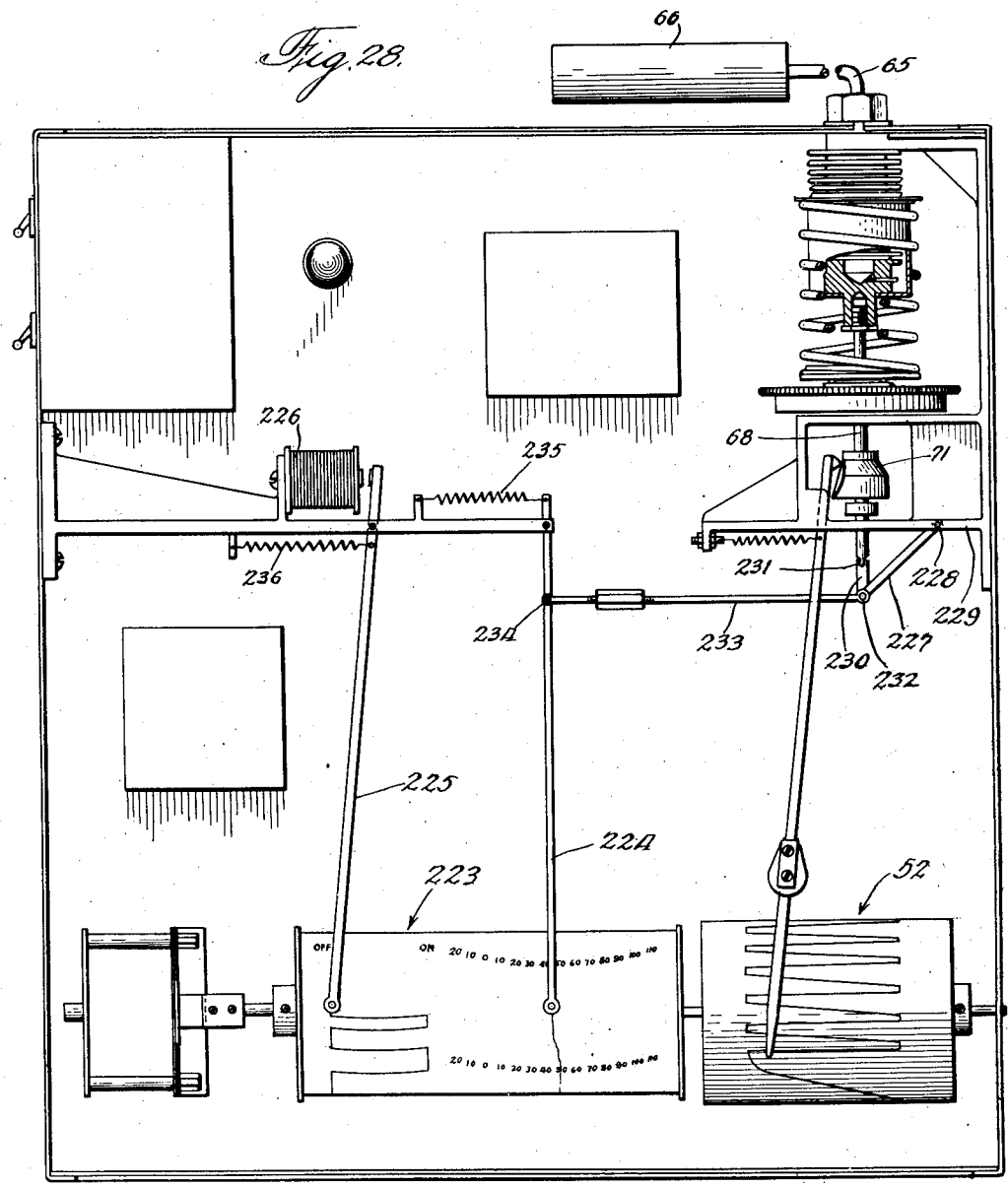

Feb. 3, 1942.    H. T. KUCERA    2,271,651
HEAT CONTROL APPARATUS
Filed Dec. 28, 1935    17 Sheets-Sheet 13
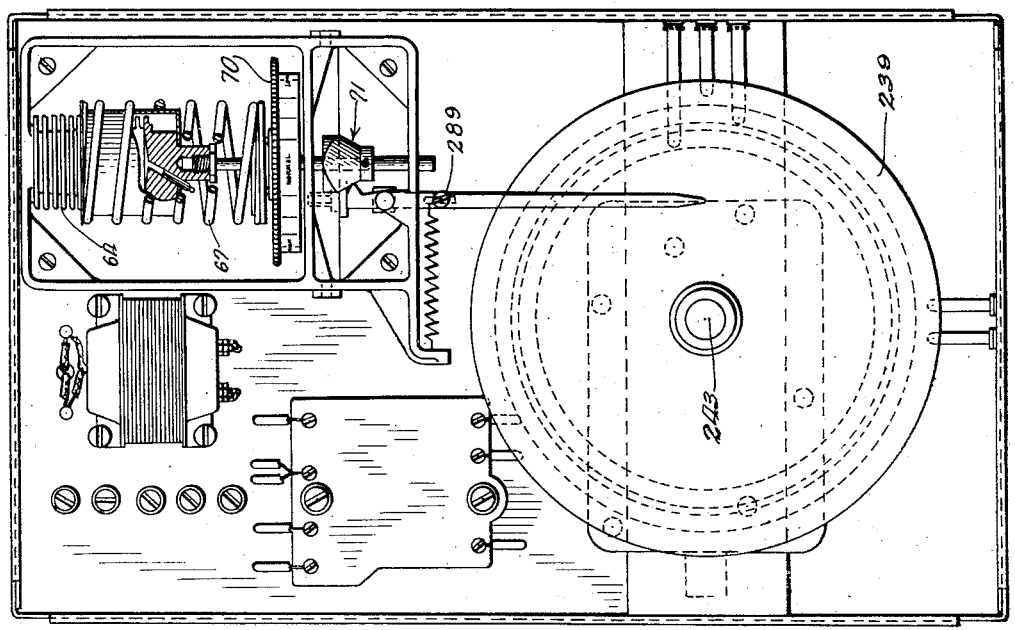
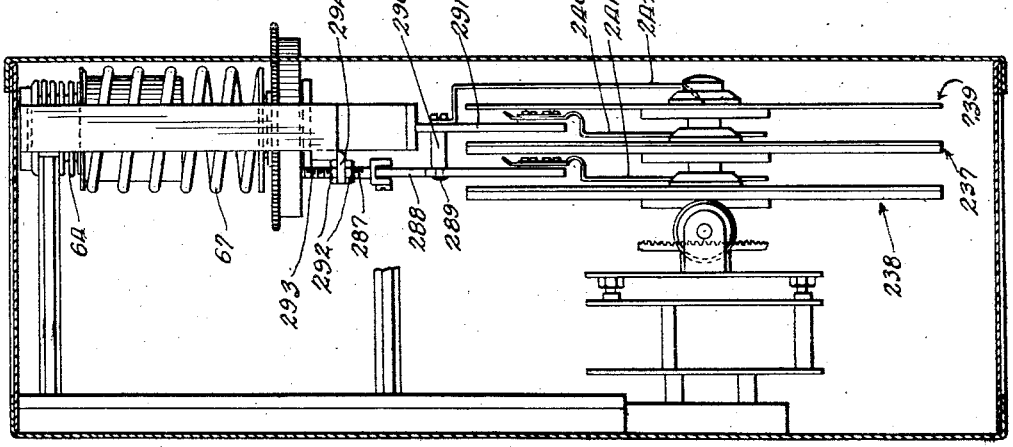
Inventor:
Henry T. Kucera
By Jones, Addington, Ames & Seibold
Attys.

Feb. 3, 1942. H. T. KUCERA 2,271,651
HEAT CONTROL APPARATUS
Filed Dec. 28, 1935 17 Sheets-Sheet 14
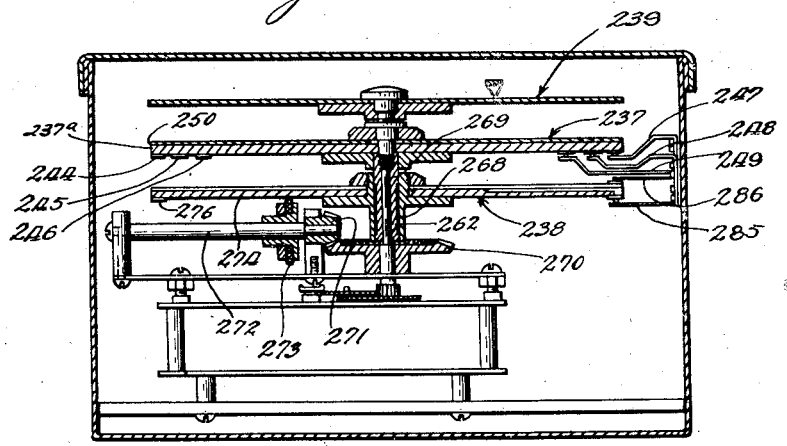
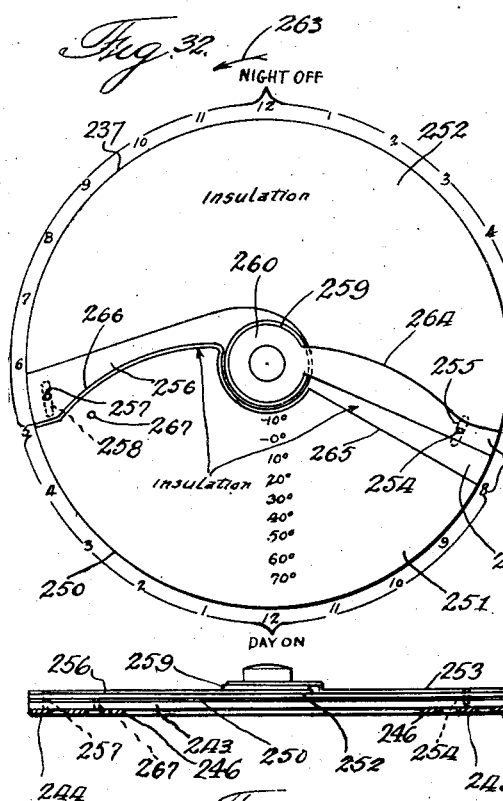
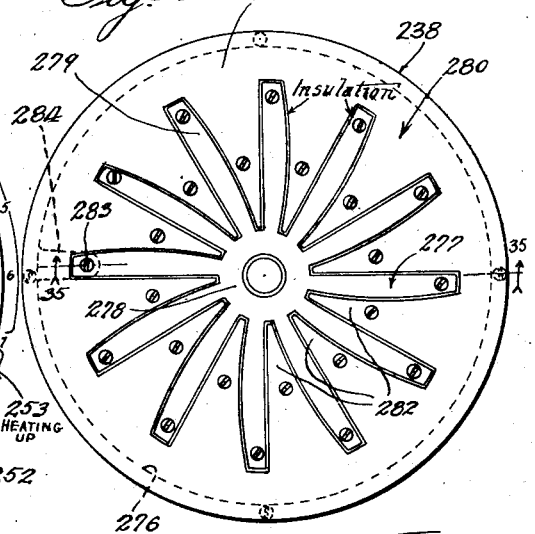

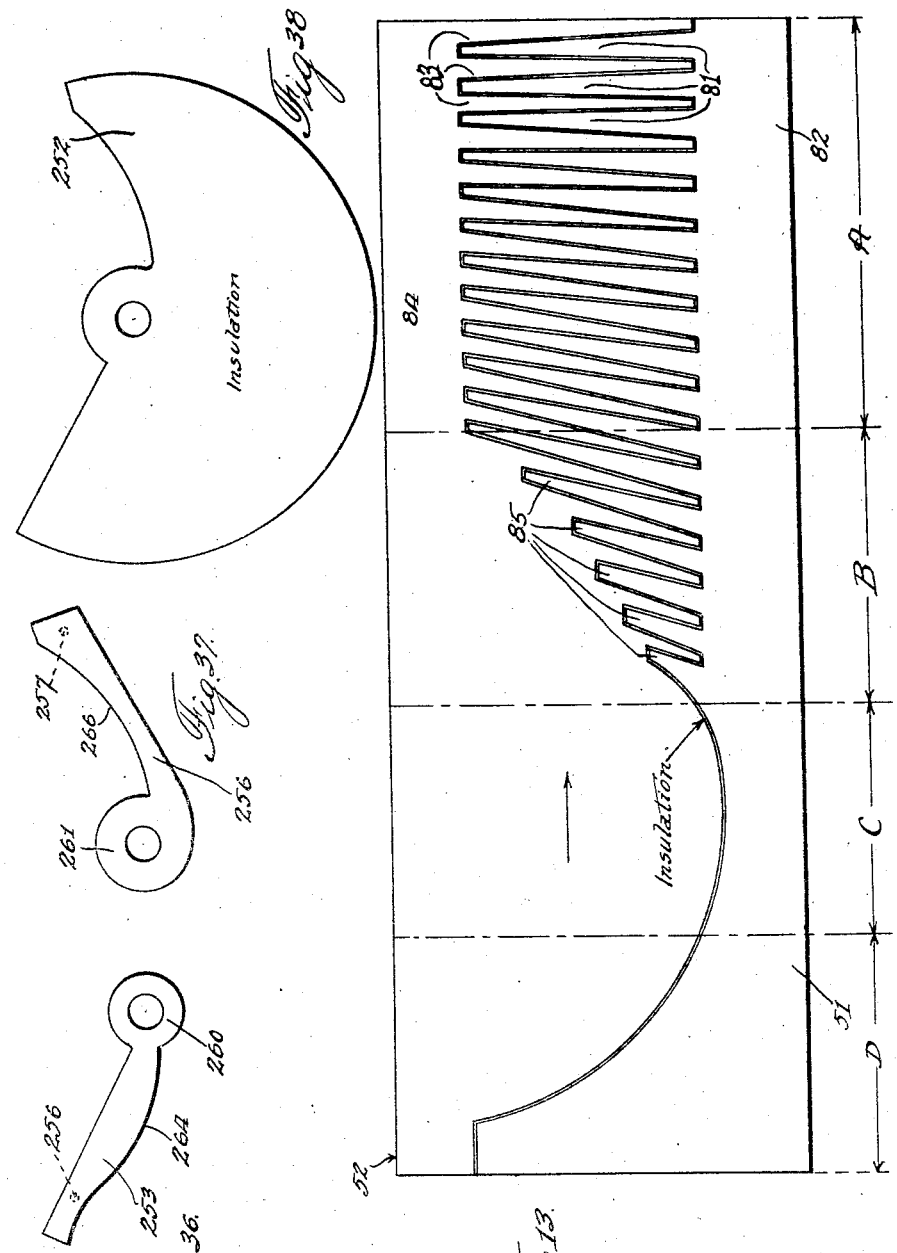

Feb. 3, 1942. H. T. KUCERA 2,271,651
HEAT CONTROL APPARATUS
Filed Dec. 28, 1935 17 Sheets-Sheet 16
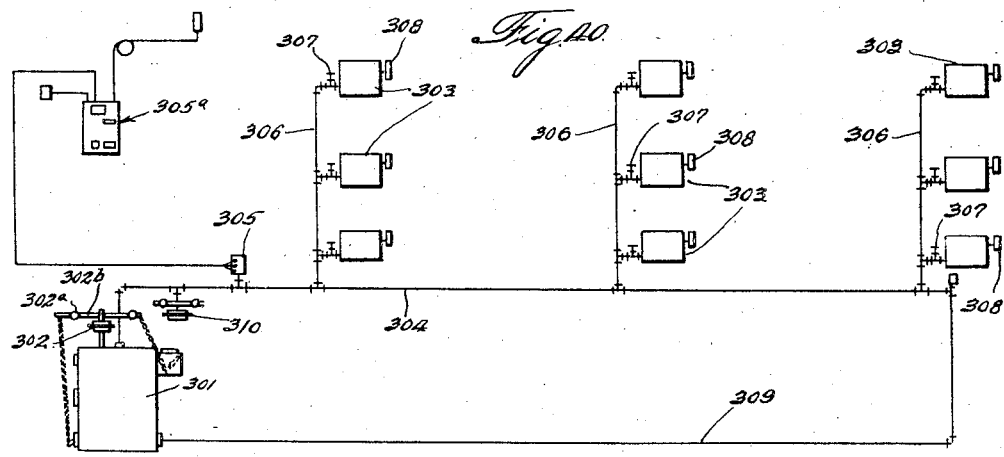
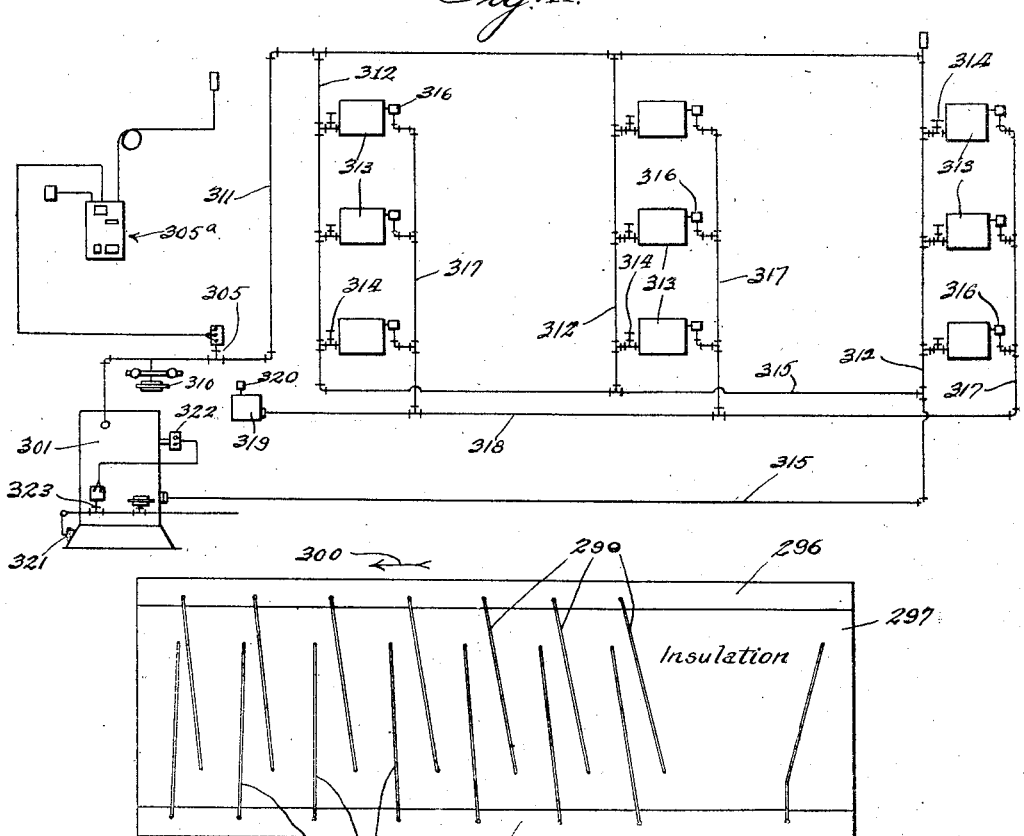

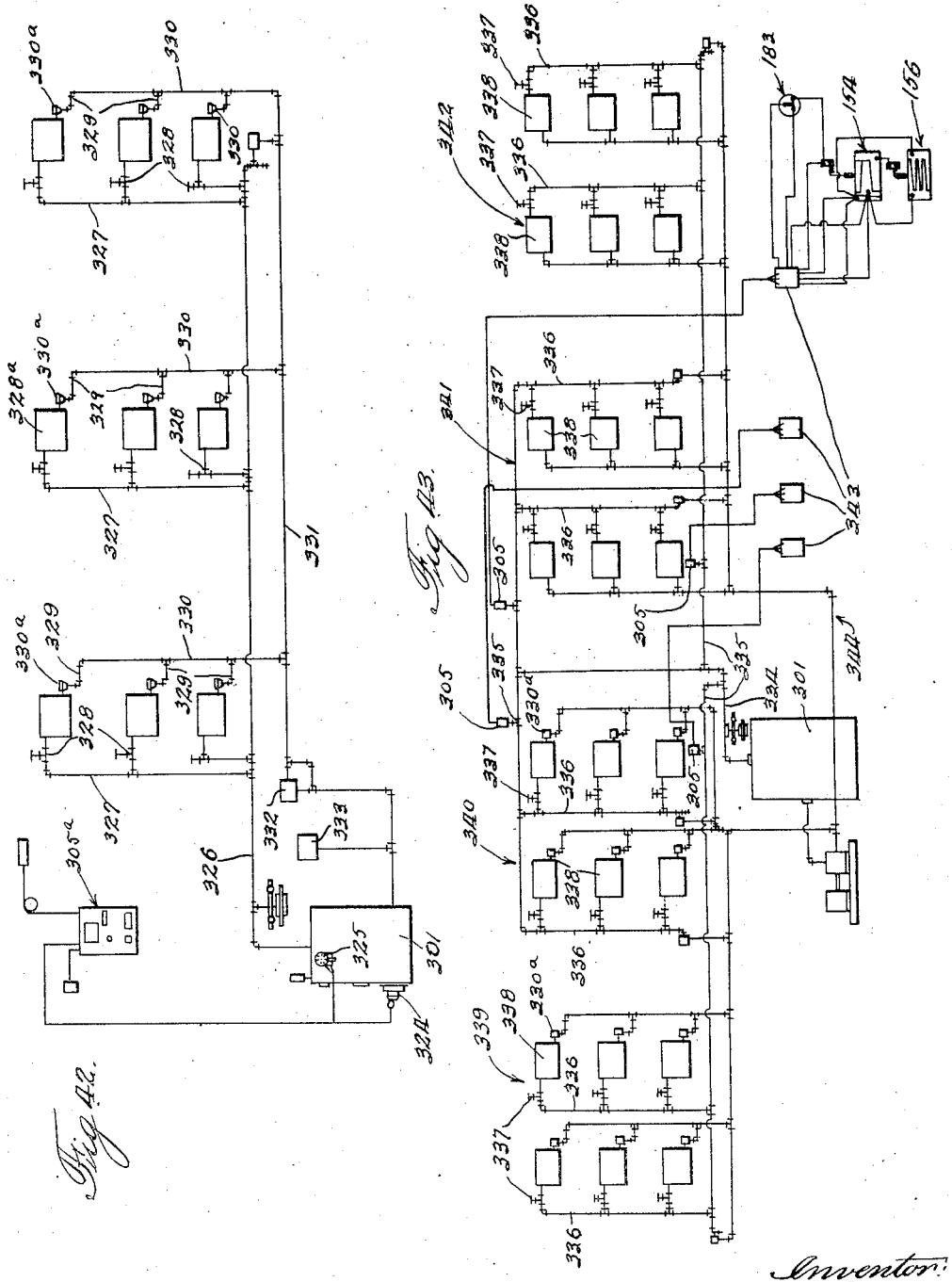

Patented Feb. 3, 1942

2,271,651

UNITED STATES PATENT OFFICE 2,271,651

HEAT CONTROL APPARATUS

Henry T. Kucera, Oak Park, Ill.

Application December 28, 1935, Serial No. 57,449

17 Claims. (Cl. 236—46)

This application is a continuation-in-part as to all of the subject matter disclosed in my pending application, Serial No. 609,972, filed May 4, 1932, and includes additional related subject matter.

My present invention relates to the provision of heat control mechanism which is applicable to the control of the means for generating the heat, or to the control of the circulation of a heating medium.

It is, of course, possible to estimate, or to ascertain by experiment, the functioning required of a known heater to raise the temperature of a known premises through a certain number of degrees of temperature, providing the heating conditions are uniform. It has already been suggested to control the circulation of hot water so as to secure a periodic circulation, and it has also been suggested to control the length of the periods; that is, either to shorten or lengthen the periods, by a thermostat responsive to the outside temperatures. Such theory of heat control has obvious advantages in the maintenance of a uniform temperature and in economy of operation, but such a theory of temperature control depends upon uniform heating conditions which, as a practical matter, never continue uniform for any considerable interval of time. That is, at night or on dull days, even when the general outside temperature remains the same, more heat is required to maintain the premises at a uniform temperature than when the sun is shining, and also, the existence and intensity of any air movements about the premises greatly affect the heat requirements for the maintenance of a uniform temperature.

One of the objects of my invention is to produce a temperature control device which will secure periodic functioning of the heating apparatus, the number of periods and the length thereof being regulated by an element responsive to temperature changes and to combine with such a control manual adjustment which will adapt the temperature responsive control to the presence or absence of sun or wind, or other general conditions affecting the heat requirements of the premises.

A further object of my invention is to provide improved apparatus for controlling the supply of heat in accordance with the temperature and building occupancy and for varying the schedule of heating according to the temperature.

A further object of my invention is to provide improved apparatus for controlling the supply of heat in which use is made of a plurality of control devices, one of which devices schedules the rate of heating according to the thermal requirements and characteristics, and another of which regulates the rate of heat supply during a portion of the schedule.

A further object of my invention is to provide improved apparatus for controlling the supply of heat to a plurality of different regions, each to be heated in accordance with variations in outside temperature and in accordance with the thermal requirements and characteristics.

A further object of my invention is to provide improved apparatus for controlling the supply of heat in accordance with temperature and thermal characteristics of the region to be heated, in which means are provided for periodically suspending or modifying the action of the daily control device periodically, as, for instance, during the week-end periods.

A further object of my invention is to provide improved apparatus for controlling the supply of heat in accordance with variations in temperature and thermal requirements, in which recording means are provided for recording the time of increase and decrease of the heat supply and for recording the temperature.

A further object of my invention is to provide improved apparatus for controlling the supply of heat in accordance with variations in temperature and the thermal requirements and characteristics of the region to be heated, in which use is made of a plurality of devices, one of which devices will cause comparatively frequent increases and decreases in the heat supply during the period in which it is in control. This frequent increase and decrease in heat supply has a special advantage in connection with steam heating systems, in that it tends to prevent water hammer from occuring in the system and provides a practically continuous modulated transfer of heat from the heat transfer devices to the premises heated.

A further object of my invention is to provide improved apparatus for controlling the supply of heat in accordance with temperature and the thermal requirements and characteristics of the region to be heated, in which use is made of a plurality of control devices for controlling the increase and decrease in heat supply, with means for transferring the control from one device to the other, and of means for varying the action of one device with respect to the other.

A further object of my invention is to provide a method of heat regulation, in which the time of starting of the heating system in the morning is automatically regulated; also the duration of the "heating-up" period, the time of regulated heating for the day-time period, and the time of shutting off the heating system at night in accordance with weather conditions.

A further object of my invention is to provide an improved method of heating comprising the introduction of steam at a substantially constant pressure differential into a plurality of condensing spaces and having automatic time-controlled means for regulating the flow of steam and temperature-controlled means for controlling the time-controlled means.

A further object of my invention is to provide an improved heating system involving the periodic introduction of heat into a building, the heating medium being distributed at a fixed pressure differential and the periods of operation being sufficiently frequent and of such duration as to maintain a constant rate of heat transmission from the heat transfer devices, the constant rate being automatically varied with the outdoor weather conditions by variation of the length of the periods.

A further object of my invention is to provide an improved method of controlling the heating of a region involving the use of automatic means for regulating the flow of heat units to the region so operated that the heat units are supplied to the region at a rate in excess of the heat loss during an automatically regulated period of time and in which, following this period of excess heating, there is an automatically regulated period of time during which heat is supplied to the region approximately in proportion to the heat loss in the region and in which this second period of time is followed by a third period during which the heat supply is cut off or lessened.

Further objects and advantages of the invention will appear from the description and claims.

I have attained the foregoing objects and results by means of the structure illustrated in the accompanying drawings, in which—

Fig. 2 is a front elevation of the structure shown in Fig. 1, the front panel of the casing being omitted to disclose the mechanism in the interior thereof;

Fig. 3 is a development of the cylinder for securing a periodicity of functioning and also permitting the control of the length of the periods;

Fig. 4 is an end view of the compensating element moved by the thermostat and which is also capable of manual adjustment;

Fig. 7 is a schematic diagram of an electric circuit suitable for employment with my invention;

Fig. 8 is a front elevational view showing another form of control apparatus embodying my invention;

Fig. 9 is a section on the line 9—9 of Fig. 8;

Fig. 10 is a section on the line 10—10 of Fig. 8;

Fig. 11 is a perspective view of the control cam of Fig. 8;

Fig. 11a is a side view of the cam;

Fig. 11b is a plan view of another form of cam which may be used;

Fig. 11c is a side view of the cam shown in Fig. 11b;

Fig. 12 is a wiring diagram for the circuit of Fig. 8;

Fig. 13 is a development showing the outline of the conducting areas of the control drum of Fig. 8;

Fig. 14 is a development showing a different outline of the conducting areas for the drum of Fig. 8;

Fig. 19 is a development showing the outlines of the conducting areas of the high speed drum of Fig. 16, and it is also a typical development of the outline of the conducting areas of the control drum of Fig. 8 where a constant temperature over the entire twenty-four hour period is desired;

Fig. 20 is a development showing the outline of the conducting areas of the low speed drum of Fig. 16;

Fig. 25 (sheet 12) is a wiring diagram of the circuit for the control device of Fig. 21;

Fig. 27 is a view showing the developments of the conducting and insulating areas of the drum of Fig. 21;

Fig. 28 is a front elevational view showing a single drum controller with a recording drum for recording alterations in the heat supply and changes in the temperature;

Fig. 29 is a front elevational view showing a disc type of control apparatus, including a 24-hour disc, a variable speed disc, and a recording disc;

Fig. 30 is a part sectional, part side elevational view of the apparatus of Fig. 29;

Fig. 31 is a horizontal axial sectional view through the discs of Fig. 29;

Fig. 32 is a front elevational view of the 24-hour disc showing the outline of the conducting and insulating areas;

Fig. 33 is an edge view of the construction of Fig. 32, parts being broken away;

Fig. 34 is a front elevational view of the variable speed disc controller;

Fig. 35 is a section on the line 35—35 of Fig. 34;

Fig. 36 is a view of one of the adjustable contact area devices of Fig. 33;

Fig. 37 is a view of another of the adjustable contact area devices of Fig. 33;

Fig. 38 is a view of an insulating disc shown in Fig. 33;

Fig. 39 is a development view showing a different arrangement of contacts on the drum;

Fig. 40 is a diagrammatic view showing a heating system embodying my invention;

Fig. 41 is a diagramatic view showing another heating system embodying my invention;

Fig. 42 is a diagrammatic view showing still another form of my heating system; and Fig. 43 is a diagrammatic view showing still another form of my heating system.

Similar reference characters refer to similar parts throughout the respective views.

Figure 1:
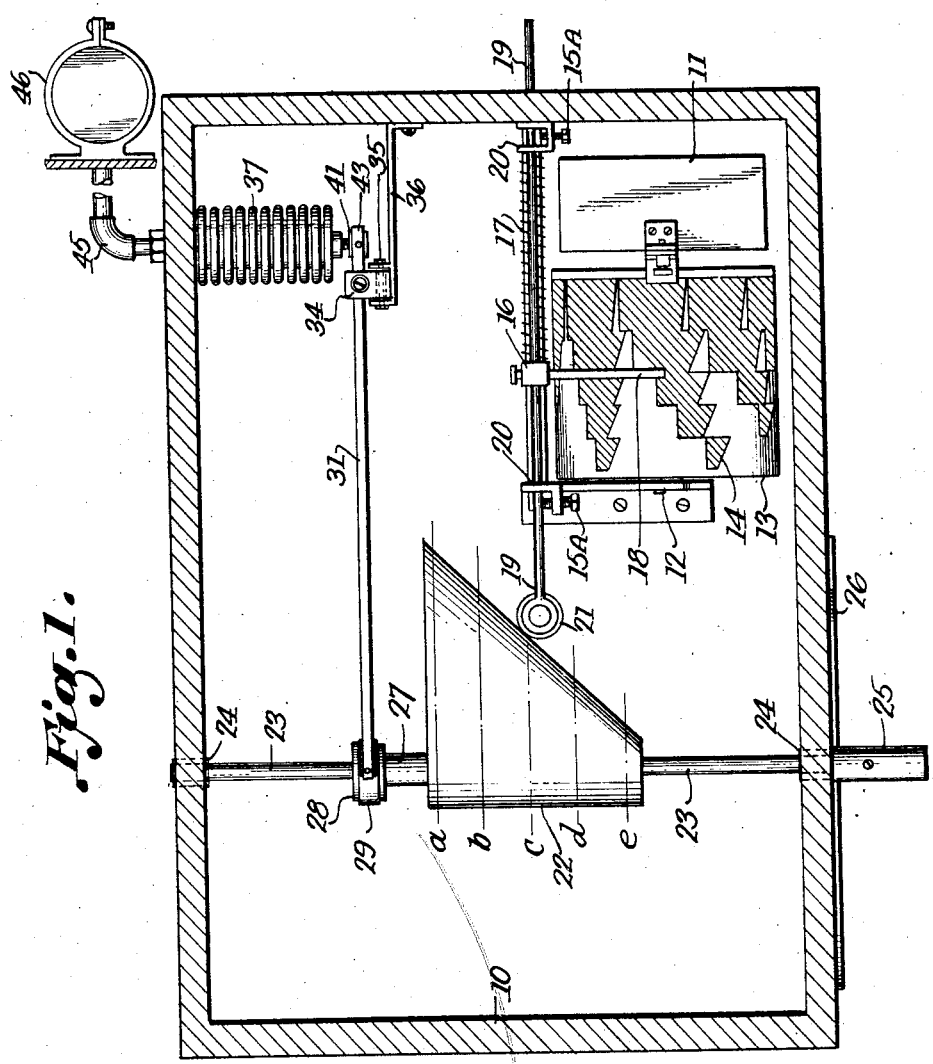
Figure 1 is a plan of a heat control structure embodying my invention.
Figure 6:
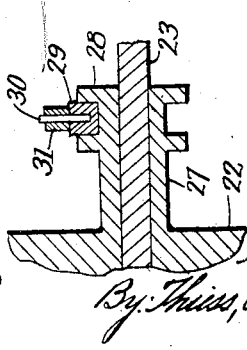
Fig. 6 is a fragmental detail section of the assembly between the lever arm and the element through which thermostatic control is effected and modified.
Figure 5:
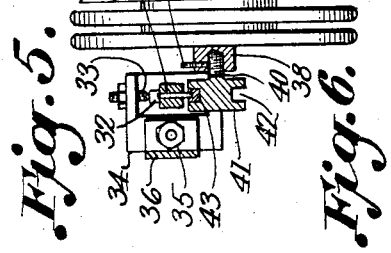
Fig. 5 is a fragmental vertical section of the assembly between the thermostat bellows and the lever which it operates.

The apparatus shown in Figs. 1 to 7, inclusive, will first be described.

The apparatus, with the exception of the element which is subjected to the outside or atmospheric temperature, may be conveniently installed within a casing 10 and includes a timing mechanism 11, rotating a shaft 12 upon which is mounted, or by means of which is rotated, a cylinder 13 made of non-conducting or insulating material. In the surface of the cylinder 13 is inset or inlaid a sheet of metal or conducting material, a development of which is shown in Fig. 3. The sheet of metal is formed to secure circumferential paths having interrupted areas 14 of conducting material diminishing in circumferential extent from one end to the other of the cylinder 13.

Mounted parallel with the axis of rotation of the cylinder 13 is a guide rod 15, and mounted to slide on the guide rod 15 is a block 16 yieldingly impelled toward the left by a coiled spring 17 surrounding the guide rod 15. The block 16 carries a contact blade 18 which, as most clearly shown in Fig. 1, extends into contact with the surface of the cylinder 13. The block 16 is fixed to a rod 19 mounted for longitudinal reciprocation in brackets 20—20, and in this connection it will be seen by reference to Fig. 2 that the bearings of guide rod 15 may be elevated or depressed through the set screws 15a to permit of the adjustment of the contact between the contact blade 18 and the cylinder 13.

Mounted upon the left-hand end of the rod 19 is an anti-friction roller 21 which co-acts with the inclined surface of a member or element 22 to press the rod 19, the block 16 attached thereto, and the contact blade 18 carried by the block, towards the right, and to permit the said rod, block and contact blade to be moved to the left by the spring 17 when the member 22 moves toward the front or to the rear of the casing 10. The member 22 is transversely recessed to slide upon a square or angled sectioned shaft 23, journaled for rotation in suitable bushings 24 mounted in the front and back wall of the casing 10. An end of the shaft 23 extends through the front casing wall and has affixed thereto a pointer arm 25, most clearly shown in Fig. 2, the unattached end of which pointer arm co-operates with a graduated arc 26 secured to the front wall of the casing 10.

A hollow stub 27, through which extends the shaft 23, projects from the element 22. The end of the stub 27 is enlarged, as at 28, and such enlargement is provided with a circumferential annular groove or channel into which, and tangentially with the bottom of which, extends a block 29 pivoted by a pin or pintle 30 to a lever arm 31. The fulcrum of the lever arm 31, as is most clearly shown in Fig. 2, comprises aligning lateral projections 32 co-operating with adjustable pivots 33 extending from the upstanding wings of a U-shaped bracket 34, the U-shaped bracket 34 being itself adjustable by means of a bolt 35 in co-operation with a bracket 36 secured to an end wall of the casing, as most clearly shown in Fig. 1. The adjustability of the fulcrum permits the securing of an alteration in the throw of the lever arm and also permits the adjustment of the apparatus on the job to conform with the characteristics of a heating system with which it is associated.

An expansion and contraction chamber 37 formed of circumferentially corrugated flexible metal is mounted upon the rear wall of the casing 10 adjacent the end of the lever arm 31, opposite to that which co-operates with the member or element 22. The assembly between the lever arm 31 and the expansion and contraction chamber 37 is very similar to the assembly of the other end of the said lever arm with the member or element 22, as is illustrated in detail in Fig. 5. At the center, upon one end of the expansion chamber 37, is fixed a socket 38 into which is threaded, and secured by a set screw 39, a stem 40 on the end of which is a cylindrical head 41 having a circumferential groove 42, into which groove extends tangentially with the bottom of said groove, a block 43 which is pinned or pivoted by the pin 44 to the lever arm. It will be noted that the groove 42 in the cylinder 41 is either in line with or parallel to the groove in the head 28 into which the block 29 enters, so that while sliding connections are secured between the lever arm and the member or element 22 and the expansion and contraction chamber 37, assembly between these parts and the lever arm will be maintained.

Running from the expansion and contraction chamber 37 is a conduit 45 which terminates at and connects with a chamber 46, preferably installed at a point subject to atmospheric or outside temperature. Chamber 46, conduit 45, and expansion and contraction chamber 37 are supplied with a mixture of materials well known to the art, which change their volumes considerably upon changes of temperature throughout the atmospheric temperature range.

The shape of the member 22 is such that considered in the direction of its axis of rotation it is generally inclined with respect to the axis of rotation so that, when the expansion and contraction chamber 37 contracts, the lever arm operates to throw the member 22 forward, the rod 19 is pressed to the right and the contact blade 18 is caused to take a position or path upon the cylinder 13 in which the extent and therefore intervals of contact are longer. Conversely, when the expansion and contraction chamber 37 expands, the member 22 moves backwardly in the casing and the rod 19, impelled by the spring 17, moves to the left, carrying the contact blade 18 to a track or path in which the intervals of contact are of lesser circumferential extent.

The shape of the member or element 22 transversely of its axis of rotation is developed so that by a rotation of the index arm 25 through a semi-circumference the contact blade 18 will be changed to a path having either one-half or twice the duration of contact. This is illustrated schematically in Fig. 4 where the shape of five circumferential paths have been projected, which, for purposes of reference, I have designated path a, path b, path c, path d and path e. Such a scheme of development is modified in the case of paths a and b in which a doubling of the firing periods in both cases results in practically constant firing or constant operation.

The circuit employed with my device is an extremely simple one and, as shown in Fig. 7, comprises the inclusion between conductors 47 of a solenoid 48, of either a single or double acting relay, with the contact blade 18 and the metallic portion 14 of the cylinder 13, whereby the rotation of the cylinder 13, by means of the clock mechanism 11, causes the periodic opening and closing of the circuit. The operation of the solenoid 48, by mechanism already well known and not a portion of this invention, can be employed for causing the opening and closing of dampers and valves, or opening and closing the circuits of gas or oil burners or stokers, whereby the functioning of these elements will be under the entire control of the mechanism herein illustrated and described, whereby intermittent periods of operation and quiescence can be secured and the lengths of said periods thermostatically controlled, and the thermostatic control altered by hand adjustment to secure longer or shorter periods of operation.

By way of example, such a mechanism is shown in Fig. 7 which shows a circuit including a source of power 48a, a motor A which, when put in motion, may act to cause an increase in the supply of heat, and a motor B which, when put in motion, may act to cause a decrease in the supply of heat. The circuit for the motors is controlled by the armature of the solenoid 48, which armature, in one position, closes the circuit for the motor A and opens the circuit for the motor B and which, in its other position, opens the circuit for the motor A and closes the circuit for the motor B.

The apparatus of Figs. 8 to 14, inclusive, will now be described. This apparatus in general is designed to accomplish the same results as that described in Figs. 1 to 7, inclusive. It comprises a rotatable time-controlled, circuit-controlling drum 49, driven by a clock mechanism 50 which may be actuated by a synchronous motor or may be spring wound, the drum being provided with two conducting areas 51 and 52, insulated from each other, which areas may be of the outline shown in Fig. 13 or in Fig. 14, a shiftable contact device 53 brought into engagement alternately with one or the other of the two conducting areas 51 or 52 on the drum as the drum revolves, means 54 controlled by outside temperature for controlling the position of the shiftable contact device 53 with respect to the drum, additional manually controled means 55 for controlling the position of the movable contact device 53 with respect to the drum, a stationary contact device 56 engaging the left-hand conducting area 52 of the drum, as viewed in Fig. 8, a stationary contact device 57 engaging the right-hand contact area of the drum, a relay 58 controlled by the circuits established by the three contact devices 53, 56 and 57, a terminal box 59 for a three-wire motor circuit leading to any suitable heat supply control device 60 (Fig. 12), such as a pneumatically operated steam valve, a control for a gas or oil burner or stoker, a manually operable three-way switch 61, which in one position places the heat supply control 60 under the control of the control drum 49, in another position disconnects the heat supply control from the drum control and places it in "on" condition, and in a third position disconnects the heat supply control means from the control of the control drum and places it in "off" condition, a manually operable switch 62 for starting and stopping the electric clock mechanism, a transformer 62a for providing current of the desired characteristics, and a pilot light 63 which, when illuminated, indicates that the heat supply is on and, when not illuminated, indicates that the heat supply is off.

The outside thermostatic control apparatus for controlling the position of the contact with respect to the drum comprises an expansible and contractible chamber 64 which may be of the sylphon type containing a liquid or gas affected by changes in outside temperature by means of a conduit 65 connecting it with a bulb 66 located at a point where it is subject to outdoor temperature, a coil compression spring 67 opposing the expansive action of the fluid in the chamber, a plunger rod 68 having a swivel connection with the reciprocable head 69 of this expansible chamber, a manually operable hand wheel 70 for effecting the swiveling or rotating movement of this plunger 68, a cam 71 (Fig. 11) having a conoidal surface and fixedly secured with respect to said plunger 68, and a lever 72 pivotally mounted at 73 carrying on its lower end the spring contact device 53 and having on its upper end a follower 74 engaging the conoidal surface of the cam 71. The expanding action of the fluid in the chamber 64 takes place against the tension of the coil compression spring 67 which engages a shoulder 75 on the head of the expansible chamber, the lower end of this spring being seated on a plate 76 resting on an anti-friction bearing 77, which, in turn, is backed up by the surface of the adjustable hand wheel 70, enabling the hand wheel to be adjusted without exerting undue torsion on the expansible chamber and without causing excessive friction opposing movement of the hand wheel. A suitable spring 78 is provided for holding the follower 74 in engagement with the cam surface. The reciprocable plunger 68 may be slidably but non-rotatably associated with respect to the hand wheel 70 by providing the plunger with a squared portion 79 (Fig. 10) slidably engaging a squared aperture in the hand wheel 70 so that the hand wheel does not interfere with the up and down movement of the plunger rod 68, but so that the hand wheel can be used to effect a rotary movement of the plunger rod and of the cam 71 carried by the lower end of the plunger.

The action of the relay 58 with respect to the motor circuit is such that when the shiftable contact 53 is in engagement with the right-hand conducting area 51 of the drum, as viewed in Figs. 8 and 12, the heat supply will be on, and such that when the shiftable contact 53 is in engagement with the left-hand conducting area 52 of the drum, as viewed in Figs. 8 and 12, the heat supply control will be off. With this construction, it will be seen that in general movement of the shiftable contact device 53 to the right, as viewed in Fig. 8 will increase the length of the "on" periods of the heat supply control means and will decrease the length of the "off" periods, and, vice versa, movement to the left of the contact device will decrease the length of the "on" periods and increase the length of the "off" periods. This, of course, is due to the outline or shape of the two conducting areas which are insulated from each other. The design of the apparatus is such that as shown in Fig. 8, a low temperature will cause a contraction of the expansible chamber 64, causing a rise in the conoidal cam member 71, tending to shift the follower member 74 to the left and the contact member 53 to the right to increase the length of the "on" periods and decrease the length of the "off" periods, thus increasing the heat supply to take care of the low temperature. Conversely, a high temperature will expand the chamber 64, pushing the cam member down and allowing the spring 78 to pull the contact member 53 to the left to shorten the length of the "on" periods and increase the length of the "off" periods to take care of the higher outside temperature. However, as previously pointed out, the control by outside temperature is not sufficient to take care of other variations and conditions such as cloudiness, high wind, humidity, variation in building occupancy, etc., and a further manual control may be exercised by means of the adjustable hand wheel 70 which can be operated to swivel the plunger rod 68 and bring a different element of the conoidal surface into cooperative relation with respect to the follower. Various designs for the surface of this cam may be employed. That shown in Figs. 8, 11 and 11a, comprises a generally conoidal surface 80, the intersections of which with different planes through the axis of the cam have different degrees of angularity with respect to the axis of the cam. Thus, in Fig. 11a, the left-hand side of the conoidal surface shown has an angle of approximately 45 degrees with respect to the axis of the cam, whereas the right-hand side of the conoidal surface has an angle with respect to the axis of the cam of approximately 20 degrees. The angularity of the intersection of the axial planes may be made to vary gradually from the greater to the lesser angle. Because of this construction, the radial distance of the follower 74 from the axis of the cam will be changed as the plunger rod 68 is turned by means of the hand wheel, thus changing the position of the contact with respect to the drum. It will be seen that a change of radial distance will take place regardless of the vertical position of the cam determined by the thermostatic control but that the amount of change of said radial displacement for a given turning movement of the cam will increase as the outside temperature decreases. It may also be seen that the rate of change of the radial distance for a given vertical movement will vary with the angular position of the cam.

By means of this manual control of the cam, an attendant can superimpose a manual control on the thermostatic control to take care of unusual conditions, such as high winds, cloudiness, excessive humidity, increase in heating load, etc., which would cause a requirement for more heat than would be furnished under the normal operation of the thermostatic control. If a condition exists calling for such additional heat supply, the attendant, by means of the hand wheel 70, will rotate the plunger 68 and the cam 71 carried thereby to shift the cam to a position in which the radial distance of the follower 74 from the axis of the cam will be increased, thus shifting the contact device to the right, as viewed in Fig. 8, to increase the length of the "heat on" periods and decrease the length of the "heat off" periods. On the other hand, if conditions are such that less than the normal supply of heat is necessary, such as might be occasioned by a very sunshiny quiet day, or over a week end when a lower maintained temperature is desired, the attendant, by means of the hand wheel 70, may rotate the cam to a position which will decrease the radial distance of the follower from the axis of the cam, resulting in a shift of the contact 53 to the left, as viewed in Fig. 8, with a consequent decrease in the heat supply. At the new angular postions of the cam, should there be a variation of temperature outdoors, the radial distance will be varied accordingly with the rate of variance greater than normal in the first case and less than normal in the second case.

The heat supply control means are thus subject to three controls, (1) the time control effected by the time-controlled movement of the rotatable drum 49 (this enables various desirable results to be accomplished, such as a daily program, including a "morning heating-up" period, a "daytime controlled" period, and a "night off" period, as well as various other daily or weekly program arrangements); (2) the outside temperature control, effected by means of the expansible chamber 64 and associated parts (this automatically increases or decreases the heat supply in accordance with a fall or rise of outside temperature); and (3) the manual control, by means of which the attendant can superimpose a control on the thermostatic control to take care of unusual conditions, such as cloudiness, high wind, excessive humidity, etc.

For ease of operation, the manually operable hand wheel 70 may be made to project through an opening in the front of the casing. Suitable indicating means may be provided on or adjacent the hand wheel to indicate the direction in which the hand wheel should be turned and the extent of the movement necessary to effect the desired increase or decrease in the heat supply.

Various designs for the contact areas on the drum may be provided, such as those shown in Figs. 13, 14 and 19. In Fig. 13, the contact areas are divided roughly into four cylindrical sectors, A, B, C and D. Referring to Fig. 13, the movement of the drum is such as to move the contact areas in the direction of the arrow with respect to the shiftable contact device 53 which cooperates with these areas. The four sectors or zones include the zone A, for controlling the daily operation which may be, for example, from 7:00 a. m. until 5:00 p. m.; the zone B, for reduced heat supply which, in an office building, might be from 5:00 p. m. until midnight; the "night off" zone C which might be from midnight until 4:00 a. m., and the "morning heating-up" zone D, to bring the region to be heated up to the desired day-time temperature, which might be from around 4:00 a. m. until 7:00 a. m.

In the first zone or sector, the "on" contact area 51 is shown as comprising a plurality of tapering fingers 81 extending from a cylindrical band portion 82, on which the "on" contact 57 rides, and an "off" contact area 52, insulated from the "on" contact area and comprising a plurality of tapering fingers 83 extending from a cylindrical band portion 84 on which the "off" contact 56 rides.

In the second zone or sector of reduced heating, the contact fingers 85 of the "on" contact area are gradually reduced in length and the width of the "off" contact area 52 is gradually widened, thus effecting a decrease in the heat supply when this second zone or sector is in control. In the "night off" period, the fingers for the "on" contact area are eliminated, so that the heat supply is constantly in an "off" condition when this zone or sector is in control, unless the outside temperature drops to a point which will cause the shiftable contact 53 to engage the band 82 to turn the heat on. In the "morning heating-up" period, the width of the "on" contact is gradually increased from left to right in Fig. 13 and the width of the "off" contact area is correspondingly decreased so that here the heat supply control means will be in "on" condition for a considerable period, the length of which varies with the outside temperature.

In some instances it may be desired to dispense with the temperature responsive means 64, 65 and 66 of Fig. 8 and substitute manually adjustable means for positioning the lever 72 with its contact arm 53 upon the rotating drum 52. This may be simply accomplished by omitting the bulb and bellows unit and mounting on cam shaft 68 in place of the compound cam 71 a simple cam 71b, shown in Figs. 11b, and 11c, which simple cam would be so designed that when the cam 71b is rotated, due to a limited rotation of the dial 70, the follower 74 co-acting with cam 71b would cause the lever arm 53 to travel across the entire face of cylinder 52.

In Fig. 14 is shown a somewhat different design of the contact areas. In this design, alternate fingers 86 of the "on" contact area are shortened, the shorter fingers extending only to the 50 degree line, so that if the outside temperature is above 50 degrees, the short fingers will be ineffective to increase the heat supply. In the design shown in Fig. 14, if the outside temperature is below zero, the heat supply means will be on constantly and if the outside temperature is above 65 degrees, the heat supply means will be constantly off. Otherwise, the design in general is as shown in Fig. 13, except that no reduced heat supply zone is provided except the "night off" zone or sector.

Fig. 19 is the design of a drum used where twenty-four hour operation is required. In this type of design, the alternate fingers 139 of the "on" contact area may be shortened as are the fingers 86 of the drum in Fig. 14, or, where it is desired to maintain a periodic but varied flow of heat during the various parts of the day the breadth of the fingers may be varied.

Fig. 12 shows the circuit diagram for the apparatus of Fig. 8. Before describing the various parts of the circuit, the relay 58 will be briefly described. This relay comprises a relay coil 87, a pair of pivoted contact devices 88 and 89, moved to the right when the relay coil 87 is energized, and moved to the left when the relay coil is de-energized, a pair of contacts 90 and 91, connected, respectively, with two of the three wires of the motor circuit with which pair of contacts the pivoted contact 88 cooperates, a contact 92, connected with a holding circuit with which contact the other pivoted contact 89 cooperates, and a resistor element 93 for preventing excessive current flow during the short time in which the relay coil circuit is shunted to release its armature.

When the hand switch 61 is set to place the drum 49 in control, and the drum in its time-controlled movement brings the "on" contact area 51 of the drum into engagement with the temperature-controlled contact 53, a circuit is established through the relay coil 87 from the transformer terminal 93a, through the resistor 93, relay coil 87, conductor 94, hand switch 61, conductor 95, shiftable contact 53, "on" contact area 51, wiper contact 57, and conductor 96 to the other terminal 97 of the transformer. The pilot light 63 is in parallel with the relay coil 87, through the conductors 98 and 99, so that when the relay coil is energized the light will be lit. When the relay coil is energized, its armature is attracted and the contact 88 is moved from engagement with the "off" motor circuit contact 90 into engagement with the "on" motor circuit contact 91 to turn the heat on. The other armature-controlled contact 89 is also brought into engagement with the contact 92, which establishes a holding circuit, independently of the circuit through the drum. This holding circuit is from the transformer terminal 93a, through the conductor 100, resistor 93, relay coil 87, armature-controlled contact 89, and conductor 101, to the other terminal 97 of the transformer.

When the drum 49 in its time-controlled movement brings the "off" contact area 52 into engagement with the shiftable temperature-controlled contact 53, a short circuit is established around the relay coil 87, this circuit being from the transformer terminal 93a, through the conductor 100, resistor 93, conductor 102, "off" wiper contact 56, "off" contact area 52, shiftable temperature-controlled contact 53, conductor 95, switch contacts, conductor 94, armature-controlled contact 89, and conductor 101 to the other side of the transformer.

When the hand switch is set to "on" position, a circuit is established through the relay coil 87, independently of the drum, this circuit being from the transformer terminal 93a, through the conductor 100, resistor 93, relay coil 87, conductor 94, and conductors 103 and 101 to the other transformer terminal 97.

When the hand switch is set to "off" position, a short circuit is established around the relay coil 87, independently of the drum circuit, this short circuit being from the transformer terminal 93a, through the conductor 100, resistor 93, conductor 104, conductor 94, armature-controlled contact 89 and conductor 101 to the other transformer terminal 97.

As previously indicated, the apparatus may be used to control any suitable type of heat supply control apparatus 60, using a three-wire circuit in which, when the wire 105 is connected in circuit with the common wire 106, the heat control apparatus 60 will be on, and when the other wire 107 is connected in circuit with the common wire 106, the heat supply control apparatus will be off.

In the use of this apparatus, the clock switch 62 is set to put the control drum 49 in operation and the three-position switch 61 is set to place the heat supply control apparatus 60 under the control of the drum 49. As the drum rotates, the heat supply control means will be on or off, depending upon whether the shiftable contact 53 is in engagement with the "on" or "off" contact area of the drum. The shiftable contact will assume a position lengthwise of the drum, dependent on the outside temperature, where it will ride on a path on the drum such that when the outside temperature is low, the "heat on" periods will be relatively long, and, consequently, the time the heat is "on" will be relatively long while the "heat off" periods and, consequently, the time the heat is "off" will be relatively short. Conversely, when the outside temperature is relatively high, the "heat on" periods will be relatively short and the "heat off" periods relatively long.

As may also be readily seen, when the outside temperature is low, the "heating up" period is contacted relatively early and remains in contact a relatively long time, whereas with a warmer outside temperature, the "heating up" period is contacted relatively late and remains in contact a relatively short time. When the outside temperature is high, the frequent periods of operation cease earlier than they do when the outside temperature is low.

Figure 15:
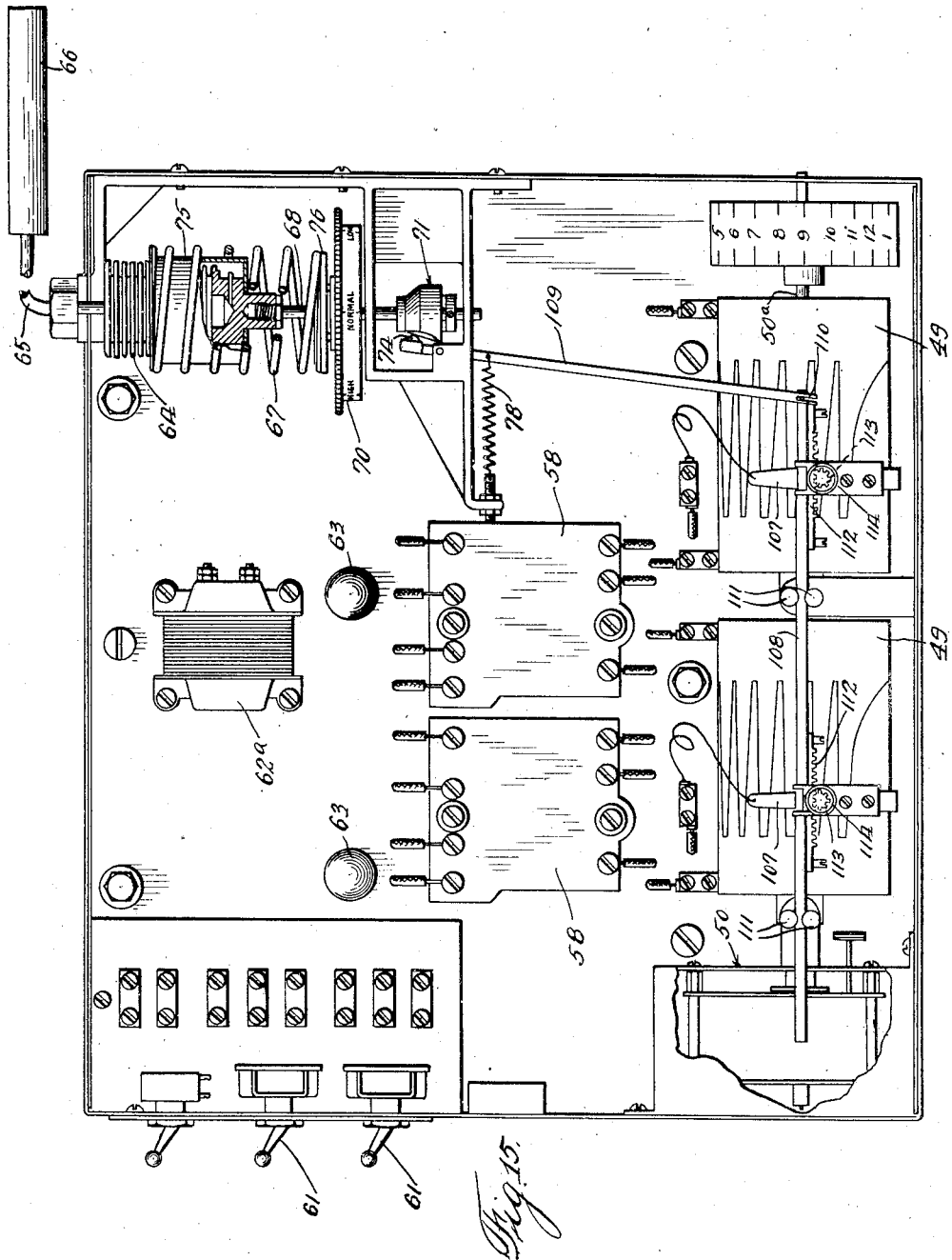
Fig. 15 is a front elevational view showing a double-drum control apparatus for controlling the heat supply for two different regions to be heated.

In Fig. 15 is shown apparatus subject to the three controls, time control, outside temperature control and attendant control, for controlling the heat supply for a plurality of different regions to be heated, such as different parts or zones of a building which may have different thermal characteristics or may be subject to different uses, or such as a number of different buildings. The apparatus employs a common outside temperature control, a common transformer and a common time control for the different regions. In this apparatus a plurality of drums 49 are employed, one for each different region, also a plurality of relays 58 controlled by the drums and a plurality of three-way switches 61, one for each of the drums. The outside temperature control apparatus is in general the same as that disclosed in connection with Fig. 8 and will not be described in further detail. The relay apparatus 58, transformer 62a, time-controlled clock mechanism 50 and three-way switches 61 are also substantially as disclosed in connection with Fig. 8. The drums 49 may be placed in axial alignment and may all be driven from the same clock mechanism 50. The angular position of the several drums 49 relative to the drum shaft 50a may be such that the heating periods of no two zones start or end at the same time. This staggering of the operation helps to balance the load on the heat generating plant.

In one form the movable contacts 107 for both of the drums shown in Fig. 15 are mounted on a common reciprocable bar 108, the position of which is controlled by the cam-controlled lever 109, which has a pin and slot connection with the sliding bar 108, as shown at 110. This reciprocable bar 108 may be mounted for ease of movement between pairs of opposed anti-friction rollers 111. The shiftable contacts 107 are mounted for independent adjustment longitudinally of the reciprocable bar. This adjustment is effected by means of a rack 112 secured to the reciprocable bar and a pinion 113 meshing with this rack and rotatably mounted on the carriage of the shiftable contact. A thumb button 114 may be provided for turning the pinion 113 to effect longitudinal adjustment of the contact 107 with respect to the reciprocable bar.

Figure 16:
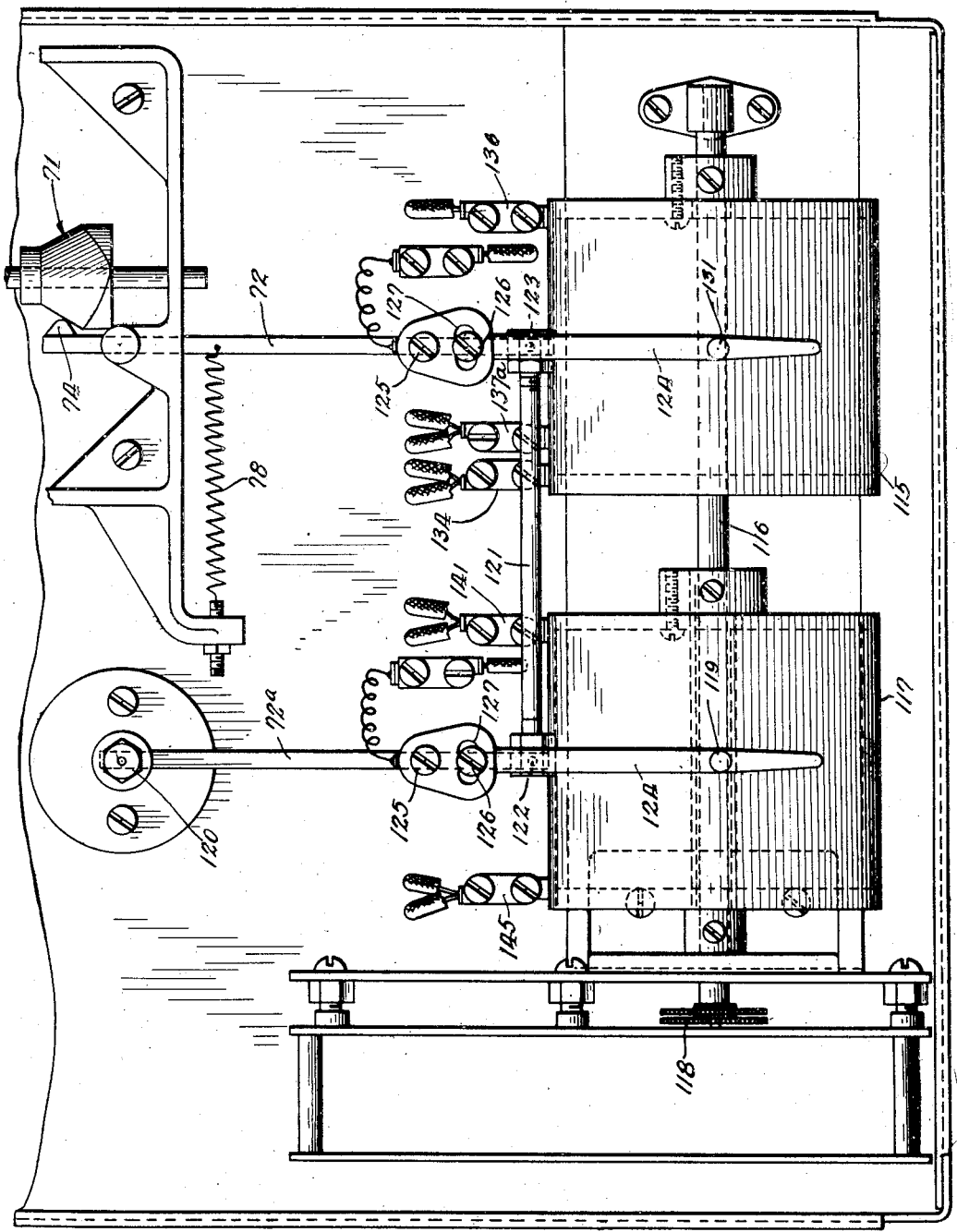
Fig. 16 is a front elevational view showing a two-drum control device, in which the control may be shifted from one drum to the other and in which one drum is driven at a higher rate of speed than the other to effect relatively frequent changes in heat supply when this drum is in control.

Another form of apparatus suitable to the adjustment of the two movable contacts 124 is as illustrated in Fig. 16, where the lever 72 is keyed to lever 72a by means of the tie-rod 121. Lever 72a, pivoted at 120 is propelled and repelled so that contact 119 moves across the face of drum 117 at the same time that contact 131 moves on drum 115. Contacts 119 or 131 may be individually positioned by loosening adjusting screws 125 and 126, rotating contact 124 in the proper direction with 125 as a pivot and again tightening set screws 125 and 126.

The contact areas on the two drums may be especially designed for the regions which they are to control. This apparatus thus enables a common triple control for the two regions and, in addition to this, a separate independent control for the two regions to take care of any special thermal characteristics of a region or any special uses to which this region is put.

Figure 17:
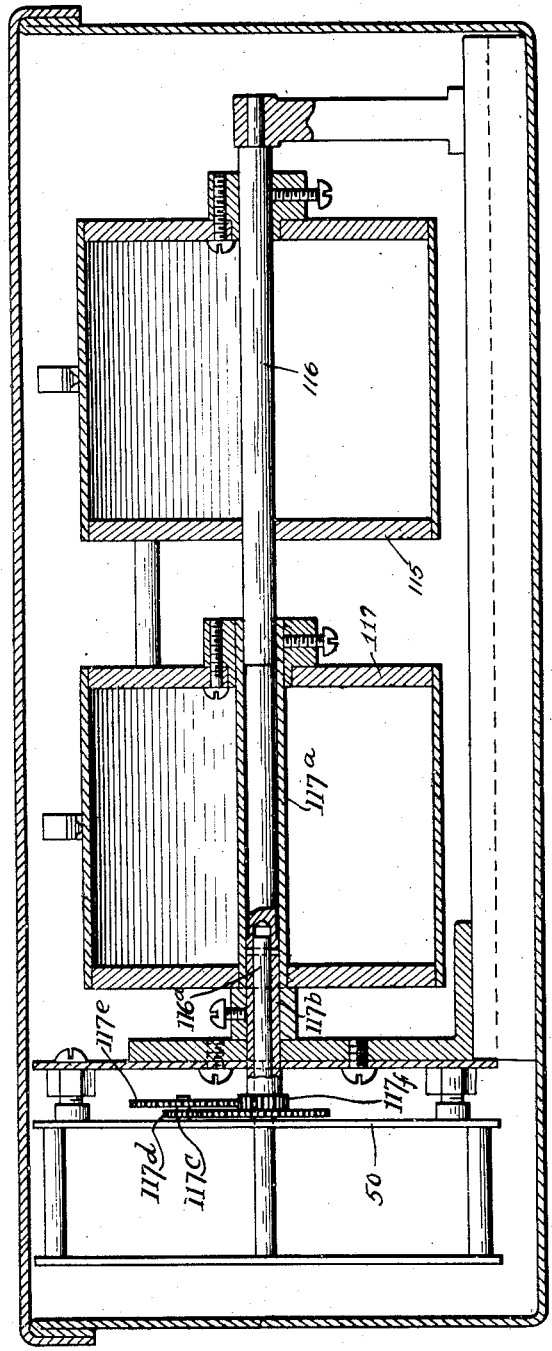
Fig. 17 is an axial sectional view of the drums and related parts of Fig. 16.

Figs. 16 to 20, inclusive, disclose apparatus capable of the triple control referred to above, involving the use of two or more time-controlled drums for controlling a heat supply control apparatus in which one of the drums may be driven at a faster rate than the other, and in which the control of the heat supply control apparatus 60 may be shifted from one to the other of the drums. One of these drums may, for instance, be a daily or twenty-four hour program and the other a drum which is rotated much faster; for instance, once every three hours. The control may be shifted from the twenty-four hour drum to the three-hour drum during the "day-time heating" period, thus enabling frequent current alterations and frequent changes from "on" and "off" in the heat supply, thus providing an accurate temperature control for the region heated and tending to produce a more even flow of heat to the region. The outside temperature control for the cam and the attendant control for the cam may be the same as those of Fig. 8 and are not disclosed in further detail. The two speed drum arrangement may be obtained by using a clock movement that has two shafts, one inside the other, the inner shaft rotating once in twenty-four hours and the outer shaft rotating once in three hours. The twenty-four hour drum 115 may be mounted directly on the shaft 116 which is keyed to the twenty-four hour shaft 116a, and the three-hour drum 117 may be mounted on a sleeve 117a keyed to the outer three-hour shaft 117b with the right-hand end of the sleeve 117a rotatably mounted on shaft 116, as shown in Fig. 17. The sleeve 117a is driven from the shaft 116a by means of a spur gear 117c rotatable with the shaft 116a, a pinion 117d meshing with the gear 117c, a gear 117e rotatable with the pinion 117d and a pinion 117f meshing with the gear 117e and mounted on the sleeve 117a. The shiftable contact devices for the two drums are both controlled from the same cam 71, as shown in Fig. 16. The shiftable contact 119 for the three-hour drum 117 may be pivotally mounted at 120 and may be connected with the shiftable arm 72 for the twenty-four hour drum by means of a link 121 pivotally connected with the two shiftable contact devices. The effective length of this link 121 may be varied to effect an adjustment of the contact 119 with respect to the arm 72. Any suitable construction may be used for this purpose, such as right- and left-hand threaded portions, respectively, on the ends of the link, threaded into nuts pivotally secured to the shiftable contact devices, respectively. By rotating the link 121 in one direction or the other, a turn-buckle effect may be secured which will shorten or lengthen the distance between the pivotal connections 122 and 123. This enables an additional adjustment to be imposed on the triple control to take care of any special thermal conditions in the region heated.

A further independent adjustment of the two shiftable contacts may be effected by making the contact arms in two parts and providing for an adjustment of one part with respect to the other.

Referring to Fig. 16, each of the shiftable contact devices has its lower contact-carrying portion 124 secured to the upper portion of the arm by means of a pivot screw 125 so that the lower portion of the arm may be angularly adjusted about this pivot and held in its angularly adjusted position by means of a clamping screw 126 extending through an arcuate slot 127 in the lower portion of the arm 124 and threaded into a part of the upper arm portion which extends below the pivot screw.

In this apparatus, the twenty-four hour drum 115 may be provided with three contact areas 128, 129 and 130, as shown in Fig. 20, these areas corresponding to the "morning heating-up," the "night off" and the "day on" periods, respectively. When the "morning heating-up" area 128 is contacted by shiftable contact 131, the twenty-four hour drum is in control; that is, the energizing circuit to the coil of the relay is completed and the heat will ordinarily be on continuously until the twenty-four hour drum shiftable contact 131 is in engagement with the "day-on" area 130. When the twenty-four hour drum shiftable contact 131 engages the "day on" contact area 130 of the drum, the control is shifted to the three-hour drum 117, which gives comparatively frequent alterations in the circuits controlling the heat supply control apparatus, thus giving an even heating effect. Thus, in the development of the three-hour drum shown in Fig. 19, there are approximately ten complete circuit cycles per hour. The relative lengths of the "on" and "off" heating periods is of course controlled during the "day on" period by the position of the shiftable contact 119 for the three-hour drum. The design of the contact areas of Fig. 19 is such that during the "day on" period, if the outside temperature is below zero, the heat will be on all of the time and such that when the outside temperature is above 60 degrees, the heat will be off all the time.

When the twenty-four hour drum shiftable contact 131 contacts the "night off" area 129, the control is again shifted to the twenty-four hour drum by the shiftable contact 131 completing a circuit through the area 129 which shunts out the coil 87 of the relay until the "morning heating-up" area 128 is again contacted in the morning. A manually operable switch is provided so that at any time the control may be taken from the drums, similar to the operation described in connection with the wiring diagram for the single drum unit as illustrated in Fig. 12.

In the development of the twenty-four hour drum shown in Fig. 20, the three contact areas 128, 129 and 130 on this drum are insulated from each other. The "morning heating-up" contact area 128 is electrically connected with a continuous contact band 132 by means of a conductor 133, this band 132 being continuously in engagement with the wiper contact 134. The "day on" contact area 130 is electrically connected with a continuous contact band 135 which is always in engagement with the wiper contact 136. The "night off" period contact area 129 is electrically connected with a contact band 137 which is always in contact with the wiper contact 137a. The contact areas themselves are successively brought into engagement with the shiftable temperature-controlled contact 131.

A development of the contact areas for the three-hour drum is shown in Fig. 19. The "on" contact area 138 comprises a series of tapering contact fingers 139, electrically connected with a continuous contact band 140 which is always in engagement with the wiper contact 141. The "off" contact area 142 comprises a series of tapering fingers 143, interfitting with the tapering fingers 139 of the "on" contact area but insulated therefrom, and an endless band 144 to which the fingers are electrically connected, which band is always in engagement with the wiper contact 145. The interfitting fingers of the "on" and "off" contact areas are successively brought into engagement with the temperature-controlled shiftable contact 119.

Figure 18:
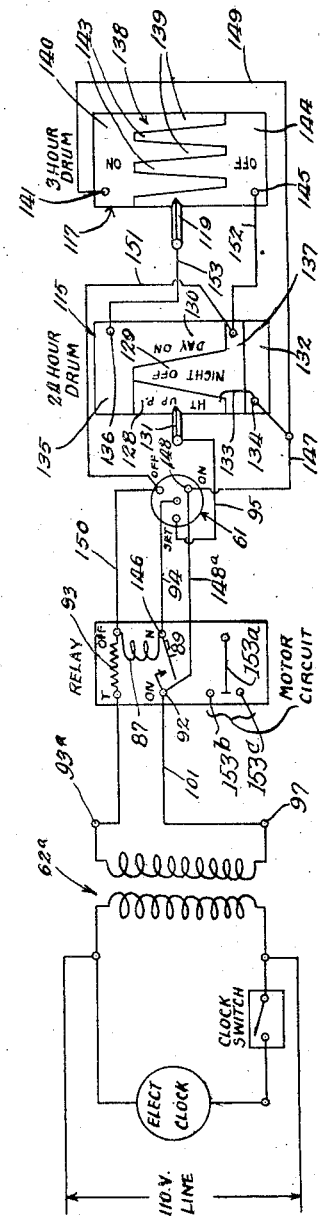
Fig. 18 is a wiring diagram for the control device of Figs. 16 and 17.
Figure 21:
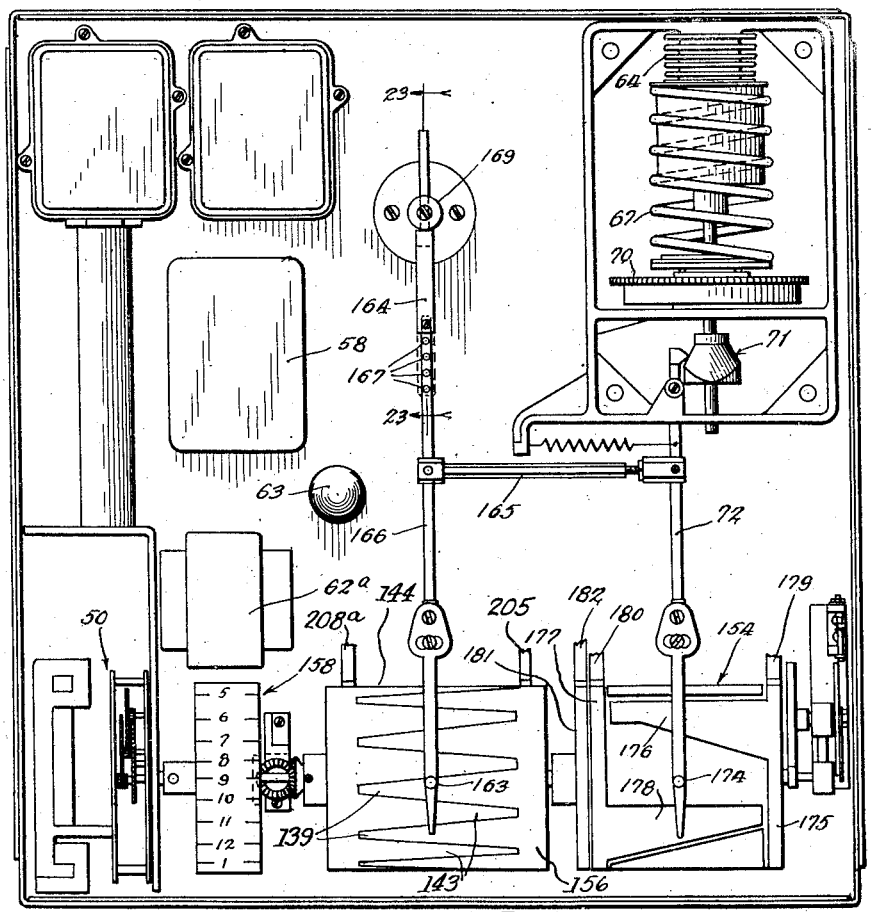
Fig. 21 is a front elevational view showing a two-drum control device, in which the control may be shifted from one drum to the other and in which the speed of one of the drums may be varied, where the arc and the swing of the lever contacting the variable speed drum may be varied and in which a week-end program device is provided.

A simplified wiring diagram of the circuits is shown in Fig. 18. To place the drums in condition to control the heat supply, the hand switch 61 is operated to connect the terminal 146 of the relay coil 87 with the shiftable contact 131 for the twenty-four hour drum.

When the shiftable contact for the twenty-four hour drum is in engagement with the contact area 128 for the "heating-up" period, the relay coil 87 is energized through a circuit from the transformer terminal 93a, through the resistor 93, relay coil 87, conductor 94 leading to the switch 61, conductor 95 leading from the switch to the shiftable contact 131 of the twenty-four hour drum, conductor 133 leading from the "heating-up" contact area 128 to the endless band 132, contact 134 engaging this endless band, conductor 147 leading from this contact to the switch terminal 148 and conductors 148a and 101, leading from this switch terminal 148 to the other terminal 97 of the transformer.

When the relay coil 87 is energized, a holding circuit is established through the armature-controlled contact 89, this holding circuit being independent of the circuit through the drum. This holding circuit is as follows: From the transformer terminal 93a, through the resistor 93, relay coil 87, and armature-controlled contact 89 to the wire 101 leading to the other terminal 97 of the transformer.

When the twenty-four hour drum in its time-controlled movement brings the "day on" contact area 130 into engagement with the temperature-controlled shiftable contact 131, the control is shifted to the three-hour drum, a circuit being established from the transformer terminal 93a through the resistor 93, relay coil 87, switch 61 to the shiftable contact 131 of the twenty-four hour drum, and thence through the "day on" contact area 130 to the shiftable temperature-controlled contact 119 of the three-hour drum and, if the contact 119 of the three-hour drum is in engagement with one of the "on" contact fingers 139, then from this "on" contact area 140 through the wiper contact 141 and conductors 149, 147, 148a and 101 back to the other transformer terminal 97.

When the three-hour drum 117, in its time-controlled movement, brings one of the "off" contact fingers 143 into engagement with the temperature-controlled shiftable contact 119, a shunting circuit is established around the relay coil 87 from the transformer terminal 93a, through the resistor 93, the conductor 150, conductor 151, conductor 152, wiper contact 145, contact finger 143, temperature-controlled shiftable contact 119, conductor 153, wiper contact 136, "day-on" contact area 130 of the twenty-four hour drum, temperature-controlled shiftable contact 131, conductor 95, conductor 94, armature-controlled contact 89, and conductor 101 to the other terminal 97 of the transformer. This shunting circuit causes the coil 87 to be deenergized and consequently the armature-controlled contact 89 moves to break the circuit between the arm 89 and the contact 92, thus discontinuing the flow of current. It will be understood that when the relay coil 87 is energized, it may cause additional heat to be supplied and when it is deenergized it may cut off or diminish the supply of heat. These results may be accomplished in any well known manner by means of a movable contact 153a engageable alternatively with contacts 153b and 153c in such a manner and combination that engagement of the contact 153a with the contact 153b will establish a motor circuit which will turn on or increase the heat supply, and engagement of the contact 153a with the contact 153c will turn off or decrease the heat supply. The movement of the movable contact 153a is controlled by the energization and deenergization of the relay coil 87.

When the twenty-four hour drum, in its time-controlled movement, brings the "night off" contact area 129 into engagement with the temperature-controlled shiftable contact 131, a shunting circuit for the relay coil 87 is established from the transformer terminal 93a through the resistor 93, conductors 150 and 151, wiping contact 128, "night-off" contact area 129, shiftable contact 131, conductors 95 and 94, armature-controlled contact 89, and conductor 101 leading to the other transformer terminal 97.

With this circuit arrangement, it will be seen that when the shiftable temperature-controlled contact 131 of the twenty-four hour drum is in engagement with the "morning heating-up" contact area 128 of the twenty-four hour drum, the heat will be on continuously until the twenty-four hour drum in its movement brings the "day on" contact area 130 into engagement with the shiftable temperature-controlled contact 131. At this point, the control will be shifted to the three-hour drum which will give frequent current alterations and consequently frequent changes from "on" and "off" in the heat supply, the comparative lengths of the "on" and "off" heat supply periods being controlled by the position of the temperature-controlled contact 119 on the three-hour drum. This condition will continue until the twenty-four hour drum in its movement brings the "night off" contact area 128 into engagement with the shiftable temperature-controlled contact 131. At this point a shunting circuit for the relay coil will be established as described above and the heat will then remain off until the "morning heating-up" period.

In Figs. 21 to 27, inclusive, is shown an apparatus, similar in many respects to that just described, employing two clock-controlled drums, driven at different rates of speed. In this form, however, means are provided for varying the speed of one of the drums and for varying the arc and swing of the lever contact engaging the variable speed drum, and means are also provided for effecting a "week-end" control by means of which, if desired, the control may be removed from the drums and the heat supply may be discontinued over the "week-end" period. Means are also provided on the twenty-four hour drum to vary at will the commencement of the "morning heating-up" period and the commencement of the "night off" period. In this form, the twenty-four hour drum 154 may be secured to rotate with the clock-driven shaft 155, and the high speed drum 156 is rotatably mounted on this shaft 155 and driven from a friction driving face 157 (Fig. 24) on the clock dial 158 by means of a manually controllable, variable speed transmission. This transmission, shown in detail in Fig. 24, comprises a friction disc 159 manually shiftable at will along the driving face 157 of the dial, a shaft 160 on which this shiftable friction disc 159 is splined and which rotates with the driven friction disc, a bevel gear 161 rotatable with the splined shaft, and a bevel gear 162 meshing with the bevel gear 161 and rotatable with the high speed drum 156. It will be seen that by shifting the driven friction disc 159 along the driving face 157, the speed of the high speed drum 156 may be varied at will, thus changing the frequency of the current alterations and the changes from "on" and "off" in the heat supply.

Figure 23:
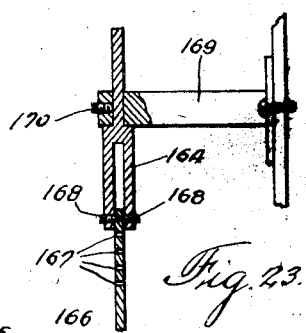
Fig. 23 is a detailed sectional view on the line 23—23 of Fig. 21.
Figures 24, 26:
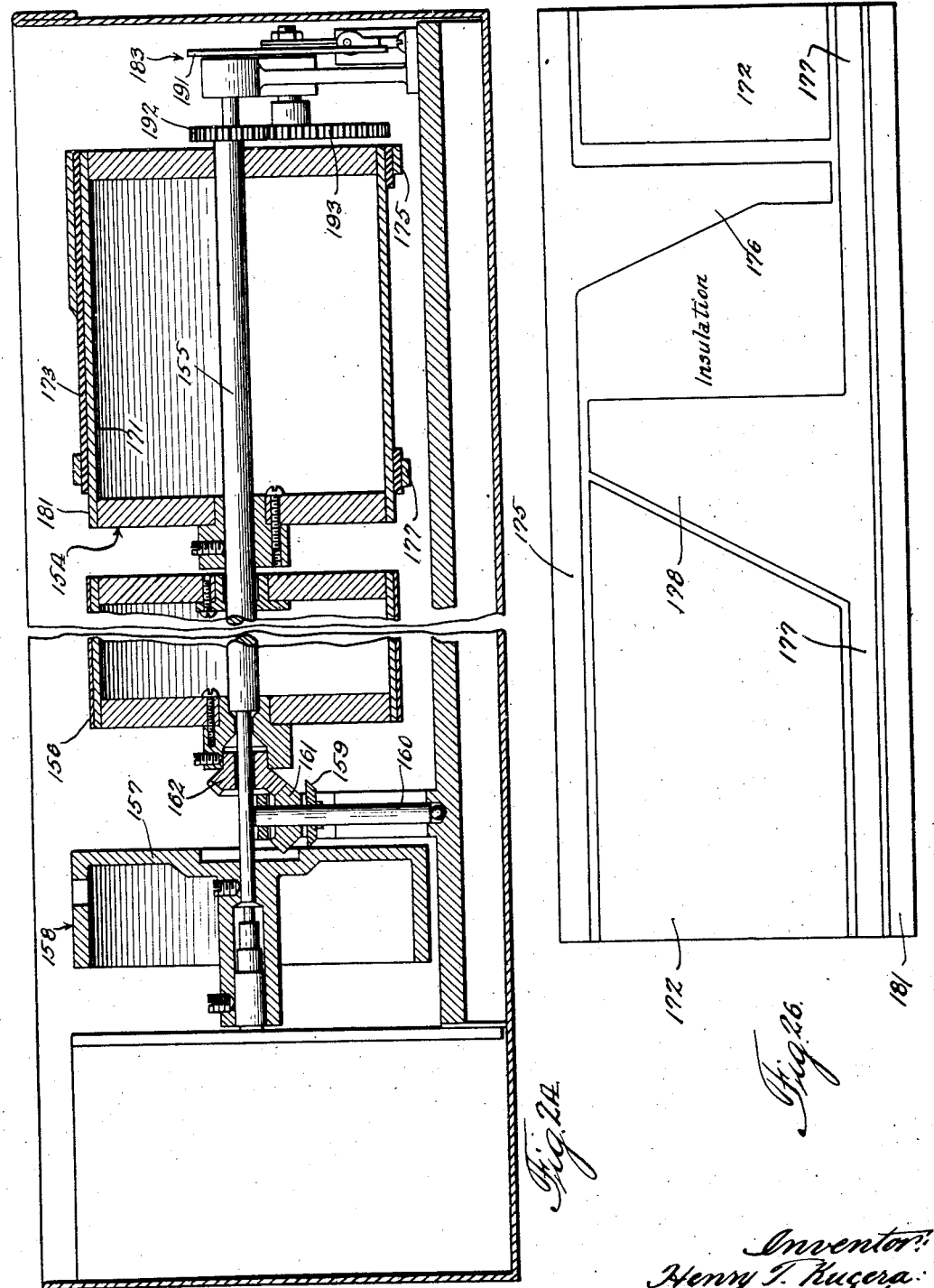
Fig. 24 is an axial sectional view of the two drums and the drive mechanism therefor of Fig. 21.
Fig. 26 is a development showing the outlines of the conducting and insulating areas of the 24-hour drum of Fig. 21.

In this form of the apparatus, a somewhat different construction is provided for the independent adjustment of the high speed drum shiftable contact. In this form, the shiftable contact 163 for the high speed drum is pivotally mounted on a vertically adjustable fulcrum yoke 164 (shown in Figs. 21 and 23) and is connected with the shiftable cam-controlled lever 72 of the twenty-four hour drum by means of a link 165 pivotally connected at one end with the lever 72 and pivotally connected at the other end with the arm 166 carrying the high speed drum contact 163. The upper end of the arm 166 is provided with a series of holes 167, any one of which may be connected with the bearing pintles 168 in the yoke fulcrum, as indicated in Fig. 23. This fulcrum yoke itself is adjustable up and down in the bracket or standard 169 and may be held in proper adjusted position by means of a set screw 170. If desired, the link 165 connecting the two arms 72 and 166 may also be made adjustable. By means of these adjustments it will be seen that the rate of movement of the high speed drum contact with respect to the twenty-four hour drum contact may be varied at will and also that the arc of contact 163 on the drum 156 may be varied at will.

As previously indicated, the "morning heating-up" period contact area on the twenty-four hour drum and also the "night off" contact area may be adjusted to vary the time at which the "morning heating-up" period will begin and also the time at which the "night off" period will begin. To accomplish this, the twenty-four hour drum is designed to comprise an inner cylinder 171 of conducting material, the exposed surface of which constitutes the "day on" contact area 172, a development of this cylinder being shown in Fig. 27, a second cylindrical member 173 of insulating material, cut away as indicated in the development in Fig. 27, to enable the temperature-controlled shiftable contact 174 to engage the exposed contact area on the inner metal cylinder 171 during the "day on" period, a band 175 of conducting material having a contact finger or area 176 extending laterally therefrom, rotatably adjustable about the insulating sleeve 173 for controlling the commencement of the "morning heating-up" period and another band 177 of conducting material having a finger or contact area 178 extending laterally therefrom and likewise rotatably adjustable about the insulating sleeve 173 for determining the time of commencement of the "night off" period. It will be seen that by a rotative adjustment of the "morning heating-up" contact area, the time of commencement of the "morning heating-up" period may be adjusted as desired, and that by a rotative adjustment of the "night off" contact area the time of commencement of the "night off" period may be adjusted as desired. The band portion 175 of the "morning heating-up" contact area enables the wiper contact 179 to remain in electrical connection with the "morning heating-up" area 176 and the band portion 177 of the "night off" contact area enables the wiper contact 180 to remain in electrical connection with the "night off" contact area continuously. A band portion 181 of the inner metal sleeve 171 extends outwardly beyond the end of the insulating cylinder 173 to provide a contact for engagement with the wiper contact 182. The contact areas for the high speed drum may, if desired, be substantially the same as those shown in Fig. 19, comprising the "on" contact band 140, "on" contact fingers 139, "off" contact band 144, and "off" contact fingers 143.

The apparatus for controlling the heat over the "week-end" period (shown in Figs. 21, 22 and 24) comprises a contact device 183 controlled by a rotatably mounted adjustable cam 184 driven from the shaft 155 on which the twenty-four hour drum is mounted. The contact device comprises a pair of stationary contacts 185 and 186 connected in circuit as hereinafter described and a shiftable cam-controlled contact 187 which, in one position, engages the stationary contact 185 and, in another position, engages the other stationary contact 186. When the movable contact 187 engages the stationary contact 186, the rotatable time-controlled drums will be in control of the heat supply, but when the movable contact 187 engages the other stationary contact 185, the drum control will be eliminated.

Figure 22:
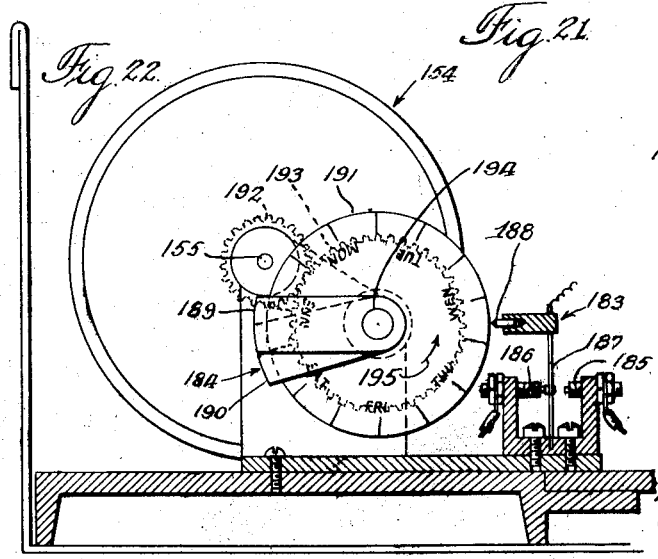
Fig. 22 is a part sectional, part elevational end view showing the 24-hour drum and the week-end control cam.

The cam control for the shiftable contact comprises a follower member 188 mounted on the flexible contact 187 and the two-part adjustable cam 184 which is brought into engagement with this follower 188 during the "week-end" period to shift the flexible contact 187 from its engagement with the fixed contact 186 into engagement with the other fixed contact 185. This two-part adjustable cam comprises a pair of overlapping cam plates 189 and 190 mounted on a time-controlled weekly dial member 191, the plates being frictionally held on the dial member in any position to which they may be adjusted. The follower member 188 on the contact 187 is wide enough so that the peripheral edge of both of the cam plates 189 and 190 and the dial 191 will engage it in their movement. By adjusting one of the cam plates, the timing of the right-hand movement of the follower may be adjusted and by adjusting the other cam plate, the timing of the release of the follower member may be adjusted. The dial plate itself may be divided to show the days of the week and divisions thereof, if desired, to enable a proper setting of the two cam plates. The dial and two cam plates carried thereby may be driven by means of a pinion 192 mounted on the shaft 155 of the twenty-four hour drum and a spur gear 193 meshing with this pinion and driving the shaft 194 on which the dial 191 carrying the cam plates 189 and 190 is mounted. The tension of the shiftable spring contact device 187 is such as to tend to hold the shiftable contact in engagement with the left-hand fixed contact 186 so that when the follower 188 drops off the edge of the cam plate 189 it will spring over into engagement with this fixed contact. The cam-carrying dial member 191 rotates in the direction of the arrow 195 (Fig. 22).

The wiring diagram for this apparatus is shown in Fig. 25. The control of the twenty-four hour drum 154 and the high speed drum 156 is similar to that of the previously described wiring diagram of Fig. 18. When the three-position switch 61 is set to place the drums in control and the twenty-four hour drum is in position to bring the "morning heating-up" contact area 176 into engagement with the temperature-controlled shiftable contact 174, a circuit is established through the relay coil 87 which will turn on the heat supply. This circuit is from the transformer contact 93a, through the conductors 196 and 197, resistor 93, relay coil 87, conductor 198, switch contact, conductor 199, "week-end" program switch 183, conductor 200, temperature-controlled contact 174, "heating-up" contact area 176, conductor band 175, wiper contact 179, and conductor 201 to the other terminal 97 of the transformer. When the relay coil 87 is energized, a holding circuit is established which will keep the relay coil energized independently of the engagement of the shiftable contact 174 with the "heating-up" area on the twenty-four hour drum. This holding circuit is from the transformer terminal 93a, through the conductors 196 and 197, the resistor 93, the relay coil 87, armature-controlled contact 202, and conductors 203 and 201 to the other transformer terminal.

When the twenty-four hour drum in its movement brings the "day on" contact area into engagement with the temperature-controlled contact, the control of the heat supply is shifted to the variable speed drum. When the variable speed drum, in its clock-controlled movement brings a "heat on" contact finger 139 into engagement with the temperature-controlled shiftable contact 163, a circuit is established through the relay coil to turn on the heat, the circuit being as follows: From the transformer terminal 93a, through the conductors 196 and 197, the resistor 93, relay coil 87, conductor 198, switch contact, conductor 199, "week-end" switch 183, conductor 200, shiftable contact 174, "day on" contact area 172, conductor 204, shiftable contact 163, "on" contact area of the variable speed drum, wiper contact 205, and conductors 206 and 201 to the other transformer terminal 97. The action of the relay 87 is similar to that described in connection with the wiring diagram shown in Fig. 18. When the relay coil 87 is energized, it may cause the heat supply to be turned on or increased, and when the relay coil 87 is deenergized, it may cause the heat supply to be turned off or decreased. The energization and deenergization of the relay coil 87 causes the movable relay control contact 219 to alternatively connect one wire 220 of the three-wire motor circuit with one or the other of the wires 221 and 222 to control the "on" and "off" action of the heat control supply apparatus 60. As indicated by the arrows leading from the legend "control circuit," this circuit includes the three wires 220, 221 and 222. As indicated by the arrows leading from the legend "on", the heat supply may be turned on or increased when the wire 220 is connected with the wire 221 by means of the contact 219. As indicated by the arrows leading from the legend "off," the heat supply may be turned off or decreased when the wire 220 is connected with the wire 222 by means of the contact 219.

When the variable speed drum in its movement brings an "off" contact finger 143 of the drum into engagement with the temperature-controlled contact 163, a shunting circuit is established around the relay coil as follows: From the transformer terminal 93a, through the conductors 196 and 197, the resistor 93, the conductors 207 and 208 and wiper 208a, the "off" contact finger 143 of the variable speed drum, the shiftable contact 163, conductor 204, "day on" contact area 172 of the twenty-four hour drum, shiftable contact 174, conductor 200, "week-end" switch 183, conductor 199, hand switch 61, conductor 198, armature-controlled conductor element 202, and conductors 203 and 201 to the other terminal 97 of the transformer.

The indicator or pilot lamp 63 is connected in parallel with the relay coil 87 so that when this coil is energized, the lamp will be lit and when the coil is deenergized, the lamp will not be lit.

To make the "week-end" program switch effective, the hand cut-out switch 209 is operated to connect the "off" contact 210 of the switch 61 with the contact 185 of the "week-end" program switch 183. If it is desired to cut out the "week-end" program switch, the hand-cut-out switch 209 is operated to connect the "week-end" program switch contact 185 with the shiftable contact 174 of the twenty-four hour drum.

Assuming that the hand cut-out switch 209 is set to make the "week-end" program switch effective and that the "week-end" program controlling cam 184 moves the shiftable contact from engagement with the stationary contact 186 over into engagement with the other stationary contact 185, a shunting circuit for the relay coil 87 will be established which will remove the heating system from the drum control over the "week-end" period and cause the heat to be turned off. This shunting circuit for the relay coil is from the transformer terminal 93a, through the conductors 196 and 197, resistor 93, conductors 207 and 211 to the "off" contact 210 of the switch 61, through the conductor 212 to the contact 213 of the switch 209, through the conductor 214 to the contact 185 of the "week-end" program switch, through the conductors 199 and 198 to the contact 215 of the relay, through the armature-controlled contact 202, and conductors 203 and 201 to the other terminal 97 of the transformer.

If it is desired to cut out the "week-end" program switch, the movable contact 216 of the hand cut-out switch is moved to the right, as seen in Fig. 25, to engage the contact 217 to establish a substitute circuit for the drum control so that the heat will remain in the drum control over the "week-end" period, regardless of the fact that the movable contact 187 of the "week-end" program switch is in engagement with the switch contact 185. This substitute circuit is from the fixed contact 186 of the "week-end" program switch, through conductor 214, to the "week-end" cut-out switch 209, and thence through the conductor 218 to the shiftable temperature-controlled contact 174 of the twenty-four hour program drum.

The use and operation of the three-position hand switch 61 in this form is the same as that of Fig. 12, the circuit arrangement also being similar.

With this construction, it will be seen that when the hand switch 61 is set to place the drums in control and the hand cut-out switch 209 is put in position to place the "week-end" program switch 183 in control over the "week-end" period, the drum control will be inoperative to turn the heat on so long as the "week-end" cams hold the "week-end" program switch contact in engagement with the fixed contact. During the time throughout the week when the "week-end" program switch contact is in engagement with the stationary contact 186, the two drums will be in control. During the "heating-up" period and during the "night off" period, the twenty-four hour drum is in control and during the "day on" period the variable speed drum is in control to effect relatively frequent circuit alterations with consequently frequent "on" and "off" changes in the heat supply. By changing the speed of the variable speed drum, the arc and the swing of the lever contacting the variable speed drum, the frequency and duration of these "on" and "off" heating periods and the relative lengths of the "on" to the "off" periods may be controlled as desired. The frequency and duration of the "on" and "off" periods may be regulated by regulating the speed of the variable speed drum. By decreasing the swing of the lever arm contacting the variable speed drum by lengthening the lever arm and by lengthening or shortening the tie rod 165 so as to select the arc through which the contact 163 will travel over the limit of the swing, the relative length of the "on" to the "off" periods may be varied.

In Fig. 28 is shown a single drum control which, in general, may be similar to that of Fig. 1, in which means are provided for recording the time of the circuit alterations effected by the drum and also a time record of the outside temperatures. The recording apparatus shown comprises a drum 223 which may be mounted on the same shaft as the twenty-four hour drum 52, a pivoted recording element 224 controlled by the outdoor temperature for making a time record of this outdoor temperature, and another pivoted recording member 225 controlled by the electromagnet 226 connected in a circuit in parallel with the relay coil 87 for making a time record of the circuit alterations effected by the drum and hence a time record of the "on" and "off" conditions of the heat supply.

The temperature recording arm 224 is actuated from the plunger rod 68 on which the control cam 71 is mounted by means of a link mechanism in such a manner that it will record the outside temperature accurately on the recording drum record. This link mechanism comprises an arm 227 pivotally mounted at 228 on the frame 229, a link 230 pivotally connected with the plunger 68 at 231 and pivotally connected with the swinging arm 227 at 232, and a link 233 pivotally connected with the temperature recording arm 224 at 234 and also pivotally connected with the junction 232 of the arm and link. With this construction, it will be seen that a downward movement of the plunger 68, corresponding to a rise in temperature, will move the temperature-recording arm 224 to the right and that an upward movement of the plunger, corresponding to a decrease in temperature, will move the temperature-recording arm to the left. In order to set the apparatus accurately, the link 233 may be made adjustable in length by means of a turnbuckle construction, or the like. A suitable spring 235 may be provided to take up any slackness in the linkage and insure accurate recording. Another spring 236 may be provided for the "on" and "off" recording arm 225 to swing the arm to "off" indicating position, when the coil of the electromagnet 226 is deenergized. With this construction, it will be seen that a time record is made of the outdoor temperatures and also of the "on" and "off" heat supply condition.

In Figs. 29 to 38, inclusive, is shown a triple control for the heat supply, including a twenty-four hour rotatable control element 237, a variable speed rotatable control element 238, and a rotatable recording device 239 for making a time record of the outdoor temperature and of the "off" and "on" condition of the heat supply, in which flat discs instead of cylinders are used for the rotatable controlling elements and the rotatable recording element. In this construction, the apparatus for controlling the position of the shiftable contacts cooperating with the twenty-four hour disc and the variable speed disc may be substantially the same as in the other forms previously described, except that the cam 71 is inverted in order to give the proper movement to the shiftable contacts. In general, the construction is such that change in position of the control cam will change the distance of both contact arms 240 and 241 and of the recording arm 242 from the axis 243 of the three coaxial discs 237, 238 and 239. The two control discs 237 and 238 may be provided on their faces, which are engaged by the contacts on the arms 240 and 241, respectively, with suitably shaped conducting areas designed, in general, to accomplish results similar to the conducting areas of the drums previously described, particularly the drums shown in connection with the apparatus of Figs. 21 to 27, inclusive.

The twenty-four hour disc 237 shown in detail in Figs. 31, 32, 33, 36, 37 and 38 comprises a circular disc 237a of insulating material forming a base member carrying on one of its faces three contact rings 244, 245 and 246, shown broken away in Fig. 33, for engagement, respectively, with three suitable wiping contacts 247, 248 and 249 (shown in Fig. 31), a second circular disc 250 of conducting material, the exposed portion 251 of which constitutes the "day on" contact area, a sector disc 252 (Fig. 38) of insulating material (shown in Fig. 38) for covering up all of the "day on" contact disc 250 except that part which is designed to cooperate with the shiftable temperature-controlled contact 240, a radially-extending, angularly-adjustable contact arm 253 (Fig. 36) of conducting material for controlling the commencement of the "morning heating-up" period overlying the insulating sector disc 252 and having a wiping contact 254 which extends through suitable registering slots 255 in the insulated sector disc 252, the circular metal disc 250 and the circular insulating disc 237a into wiping engagement with the contact ring 245, and a second radially-extending angularly-adjustable arm 256 (Fig. 37) of conducting material for controlling the beginning of the "night off" period, having a wiping contact 257 extending through suitably-located registering slots 258 in the insulating sector disc 252, the circular metal disc 250, and the circular insulating disc 237a into wiping engagement with the ring contact 244. An insulating washer 259 is provided between the central eye portions 260 and 261 of the adjustable contact arms 253 and 256, respectively, to insulate these arms from each other. This twenty-four hour disc is clamped in place on the time-controlled twenty-four hour shaft 262 to rotate therewith, as shown in Fig. 31. As the disc 237 rotates in the direction of the arrow 263 (shown in Fig. 32), the front edges of the three contact areas 253, 251 and 256 are successively brought into engagement with the outside temperature-controlled contact 240. The circuit arrangement is such that when the front edge 264 of the "morning heating-up" arm 253 engages the temperature-controlled contact 240, the heat will be turned on and will remain on until the front edge 265 of the "day on" contact area engages the temperature-controlled contact 240. When this "day on" contact edge engages the temperature-controlled contact 240, the control is shifted to the variable speed disc 238, which is generally similar to the variable speed drum 156 of Fig. 24 and which will be described in detail later. The variable speed disc remains in control until the front edge 266 of the "night off" contact engages the temperature-controlled contact 240, which will cause the heat to be turned off. The heat remains turned off until the front edge 264 of the "morning heating-up" contact area again engages the temperature-controlled contact, when the cycle will be repeated. By angularly adjusting the "heating-up" contact arm 253 and the "night off" contact arm 256, the commencement of the "morning heating-up" period and the commencement of the "night off" period may be adjusted as desired. The "day on" contact area is electrically connected with the inner one (246) of the contact rings by means of a suitable conductor 267, as shown in Figs. 32 and 33.

In general, a shifting of the temperature-controlled contact 240 toward the axis of the disc will increase the length of the "morning heating-up" period and a shifting of the temperature-controlled contact 240 away from the axis of the disc will decrease the "morning heating-up" period, the length of the "morning heating-up" period being proportional to the angular movement of the disc between the instant of engagement of the edge 264 with the contact 240 and the instant of engagement of the edge 265 with the contact 240. It will be seen that in general this required angular movement increases as the contact 240 approaches the axis of the disc, because of the relation of the edges 264 and 265 to each other.

The variable speed disc 238 is clamped on a sleeve 268 which is rotatably mounted on a sleeve 269 against which the twenty-four hour disc 237 is clamped and is driven by a step-up variable speed transmission, as shown in Fig. 31. This variable speed transmission comprises a bevel gear 270 rotatable with the twenty-four hour shaft, a bevel pinion 271 meshing with this gear 270, a shaft 272 on which the bevel pinion 271 is mounted and a friction wheel 273 splined on this shaft and shiftable across the friction driving face 274 of the variable speed disc. This variable speed disc (shown in detail in Figs. 34 and 35) comprises a circular insulating disc 275 forming a base, a conductor ring 276 secured to one face of this disc, an "on" contact area plate 277 of conducting material comprising a central annular portion 278 and a plurality of arms 279 radiating therefrom, and an "off" contact area plate 280 secured to the insulating disc 275 and comprising an outer annular portion 281 and a plurality of arms 282 extending inwardly therefrom and lying between the outwardly-extending arms 279 on the "on" contact area but insulated therefrom. The "on" contact area plate 277 is electrically connected with the conductor ring 276 in any suitable manner, as by a screw 283 extending through one of the arms 279 of the conducting plate 277 and extending through the insulating disc 275 and threaded into an inwardly-extending arm or finger 284 on the conductor ring 276 (Fig. 34). A pair of wiping contacts 285 and 286 are provided, as shown in Fig. 31, contact 285 engaging the conductor ring 276 which is electrically connected with the "on" contact area 277 and contact 286 engaging the ring-shaped outer portion 281 of the "off" contact area. With this construction, during the "day on" period, when the twenty-four hour disc shifts the control to the variable speed disc, the heat will be on or off, depending upon whether an "on" contact arm 279 or an "off" contact arm 282 is in engagement with the shiftable temperature-controlled contact 241. In the variable speed disc also the duration of the "heating" period, in general, will be increased as the temperature-controlled contact moves toward the axis of the disc and decreased when the temperature-controlled contact moves away from the axis of the disc, due to the shape of the arms 279 and 282 of the "on" and "off" contact areas.

The recording disc 239 is secured to rotate with the twenty-four hour shaft and the recording pointer 242 is mounted to shift with the shiftable contact 240 of the twenty-four hour disc so that it will record the temperature on a chart secured to the recording disc. In this form also it is obvious that means may be provided for recording the "on" and "off" condition of the heating apparatus, if desired.

In order to provide an adjustment of the shiftable contact 241 for the variable speed disc, independently of the common adjustment for the two shiftable contacts 240 and 241, which may be effected by the hand wheel 70, the fulcrum yoke 287 of the arm 288 which carries the shiftable contact 241 for the variable speed disc may be vertically adjustable, a pin and slot connection 289 being provided with a stud 290 carried by the arm 291 which carries the contact 240 to permit of this vertical adjustment of the fulcrum. This vertical adjustment of the fulcrum yoke may be effected in any suitable manner, as by the provision of two nuts 292 threaded on the shank 293 of fulcrum yoke 287, one above and one below a supporting arm 294, through which the shank of the fulcrum yoke extends and to which the fulcrum yoke is adjustably anchored.

In this form, the circuit connections may be substantially the same as those disclosed in connection with the apparatus previously described, the contact areas on the discs functioning in general as do the contact areas on the drums, and the wiper contacts and shiftable contacts being connected with suitable circuits for accomplishing the desired controls.

In Fig. 39 is shown a development of the outer surface of a rotatable time-controlled contact drum in which the contact fingers which are successively brought into engagement with the shiftable temperature-controlled contact are reduced so as to be little more than line contacts, with a substantial area of insulating material between the contact fingers. In this form, the surface of the drum is provided with a contact band 295 of conducting material continuously in engagement with the "on" wiper contact, a contact band 296 at the other end of the drum continuously in engagement with the "off" wiper contact, and two series of line contact members embodied in the insulating material 297 of the drum, the contact members 298 of one series being electrically connected with the "on" contact band 295 and the contact members 299 of the other series being electrically connected with the "off" contact band 296. Due to the use of the holding circuit previously described, it will be seen that the apparatus will be in "on" condition from the instant the temperature-controlled contact engages one of the "on" contact members 298 until the instant when it engages one of the "off" contact fingers 299. The movement of the drum surface with respect to the wiper contact is indicated by the arrow 300. In this form it will be noted that the closer the temperature control contact is to the "on" contact band the greater will be the duration of the "on" periods, and vice versa.

In Fig. 40 is shown a steam heating system controlled by one of the forms of apparatus previously described, which apparatus embodies the three controls, time, outside temperature and manual control. This shows a one-pipe system of steam heating in which a boiler 301 is provided having means 302 for controlling the steam pressure, the extent of the pressure being regulable by adjusting the weights 302a on the lever arm 302b. Steam is distributed to the radiators 303 through the main conduit 304. In this main conduit 304 is located an automatically operated shut-off valve 305 controlled by the triple control regulator 305a, which may be in general similar to the control apparatus previously described, that shown diagrammatically corresponding to the construction shown in Fig. 8. The branch risers 306 lead from the main conduit 304 to the radiators through shut-off valves 307. Each of the radiators may be provided with an air valve 308 to permit the escape of entrained air while maintaining the steam within the radiators. If desired, air valves may also be installed on the branch risers and on the main conduits. The condensation from the radiators may be returned to the boiler through conduit 309.

In order to still further insure a constant pressure, a suitable pressure reducing valve 310 may be provided which will insure a constant steam pressure on the outlet side of the valve 310. With this system it may be desirable to use some positive means in return line 309, such as a pump to return the water of condensation to the boiler. In this system, the single valve 305, subject to the triple controls, controls the supply of steam to the entire system. The triple control regulator 305a provides a "morning heating-up" period, a "day on" period, in which the valve is opened and closed at relatively frequent intervals in order to maintain a substantially even heat in the region, and a "night off" temperature, in which the temperature is maintained at a point considerably lower than the normal "day time" temperature.

A balanced distribution of steam throughout the entire system may be obtained by the incorporation of metering devices at the inlet to each radiator, so designed as to permit the simultaneous introduction of steam to all of the radiators at a rate proportional to the heat requirements. Another method of balancing distribution might be by the use of metering devices in the air valves 308.

In Fig. 41, my triple control apparatus 305a is shown in conjunction with a different system of steam heating, known as the "air line system." In this system, steam is generated in the boiler 301 and circulated through the main conduit 311 and risers 312 to the radiators 313. The water of condensation from the radiators is returned to the boiler, through the valve connections 314 and risers 312 to the return main 315.

Air entrained in the radiators is liberated through the air line valves 316. The air line valves 316 permit the discharge of air and entrained gases but prevent the escape of steam therefrom. These air line valves are connected through the risers 317 to the return header 318, which may be connected with an air pump 319 which operates to withdraw the entrained air and non-condensable gases from the radiators and conduits and to discharge these gases to the atmosphere through a check valve 320. Where so desired, positive means, such as a pump, may be used in the return line 315 to return the water of condensation to the boiler. Steam may be generated in any suitable manner, as by means of a gas burner 321. The pressure may be regulated by means of a suitable electrical pressure regulating device 322 connected to a valve 323 in the gas line to the burner which operates to maintain a fixed pressure in the heating system. In this form, my triple control regulator may operate a motor valve 305 in the main conduit 311 so as periodically to introduce steam to the radiators.

A balanced distribution of steam throughout the entire system may be obtained by the incorporation of metering devices at the inlet to each radiator, so designed as to permit the simultaneous introduction of steam to all of the radiators at a rate proportional to the heat requirements. Another method of balancing distribution might be by the use of metering devices in the air line valves 316 or in the connections between the air line valves and the risers.

In Fig. 42 my improved control apparatus is shown in connection with a two-pipe system of steam heating. Steam is generated in the boiler by means of heat-generating equipment 324, which may be an oil burner, stoker, gas burner, or the like. A pressure safety switch 325 regulates the pressure of steam between predetermined limits. Steam is conducted from the boiler, through the main conduit 326, risers 327 and valved branch connections 328 to the radiators 328a. The condensation, entrained air, and non-condensable gases leave the radiators through the branch connections 329, passing through the risers 330 to the header 331. The entrained air and non-condensable gases are discharged to the atmosphere through an air eliminating device 332. Water of condensation is returned to the boiler by gravity or by means of a boiler return trap 333. A balanced distribution of steam may be obtained by orificing all radiators.

In this form, the triple control apparatus 305a is shown as controlling the supply of fuel to the steam generator, which steam generator is so designed that when in operation it supplies steam at a substantially constant pressure to the heating system. When the triple control apparatus shuts off the supply of fuel, the supply of steam to the radiators is automatically discontinued.

In Fig. 43 I have shown my improved triple control apparatus in conjunction with a zone control or region control system of heating. In this zone control system any one of the types of heating systems previously illustrated may be used. In the system shown in Fig. 43, steam is generated in the boiler 301, from which it passes through the conduit 334 into the four branch mains 335, thence passing through the branch risers 336 and valve connections 337 to the radiators 338. Four different zones 339, 340, 341 and 342 are shown in this system, each having its own branch main 335 in each of which is installed an automatic valve 305, each of which is periodically operated by means of one of my triple control apparatuses 343. The steam distribution in Fig. 43 is substantially the same as that of Fig. 42, embodying a two-pipe system, with one line 334 for the steam supply and another line 344 for the return of the condensation to the boiler and for the elimination of the air and non-condensable gases.

Each of the four automatic valves 305 for the four different regions may be controlled by one of my improved control apparatuses 343 which may be practically any one of the forms previously described, the form shown being substantially that corresponding to the diagram of Fig. 25, which includes a time-controlled twenty-four drum 154 for controlling the beginning and end of the "morning heating-up" period, beginning and end of the "day on" heating period and the beginning and end of the "night off" period, and a variable speed drum 156 which controls the "on" and "off" condition of the heating system during the "day on" period. This apparatus also may be provided with the "week end" program control apparatus 183. In this form, the time-controlled drums may be so set or driven that the beginning and end of the "heat on" and "heat off" periods of the several drums shall not synchronize with each other, thus staggering the heat flow and leveling the load on the boiler.

By the inclusion of means for regulating the distribution of heat to the radiators 328a of Fig. 42 or to the radiators 338 of Fig. 43, it is possible to eliminate the radiator trap means 330a, normally used in this type of system for permitting the discharge of condensate and non-condensable gases from the radiators while preventing the escape of steam therefrom.

Further modifications will be apparent to those skilled in the art and it is desired, therefore, that the invention be limited only by the prior art and the scope of the appended claims.

Having thus described my invention, what I claim and desire to secure by Letters Patent is:

1. Heat control apparatus comprising heating means, timing mechanism, and electrically controlled means for securing alternating periods of activity and quiescence in the heating means comprising a rotatable element actuated by said timing mechanism, electrical conducting areas alternately disposed upon the surface of said rotatable element so as to provide means for alternately controlling the periods of activity and quiescence of the heating means, an adjustable contact element mounted to engage the said areas upon said rotatable element, temperature responsive means, and means co-actively related with said contact element and said temperature responsive means comprising a cam arranged for rotational and longitudinal movement whereby the rotation of said cam will render a different segment of the cam surface effective for operation through longitudinal movement thereof, a relay having a solenoid, and an electric circuit including said solenoid, said contact element, a conducting area of said rotatable element, and said electrically controlled means.

2. A temperature control apparatus comprising heating means, a clock mechanism, an electric circuit for controlling said heating means, apparatus actuated by said clock mechanism for intermittently opening and closing said electric circuit, and means for modifying the relative lengths of the opened and closed periods comprising a movable control member and transmission between said control member and said opening and closing apparatus comprising an element rotatable about its axis and movable longitudinally of its said axis, and a member controlled by said movements whereby the longitudinal movement of said element will secure modification in accordance with a particular meridional development of said element and the rotation of said element will bring a different meridional development into operation.

3. A temperature control apparatus comprising heating means, a clock mechanism, an electrically controlled means actuating said heating means, apparatus comprising a rotatable element having upon its surface electrically conducting areas and operated by said clock mechanism, a movable electrical contact element engaging the surface of said rotatable element for intermittently operating said first electrically controlled means, and actuating means for moving said contact element, including a transmission element rotatable about its axis and movable longitudinally of its axis, and means responsive to both said rotatable and axial movements for positioning said electrical contact element upon the surface of said rotatable element in accordance with the combined effect of both said movements.

4. In a heat control system, the combination of heating means with timing mechanism, electrically operated means for securing alternating periods of activity and quiescence of said heating means, control means for said electrically operated means comprising a rotatable element actuated by said timing mechanism and having electrical conducting areas upon the surface thereof, an adjustable electrical contact element contacting the surface of said rotatable element and adapted to energize said control means for securing the aforesaid alternating periods of activity and quiescence of said heating means, temperature responsive means, and transmission means acting between said contact element and said temperature responsive means including a cam follower and a cam having differently designed meridional developments arranged for rotational and axial movement whereby the rotation of said cam renders a differently designed cam surface effective for operation of said cam follower through the longitudinal movement of said cam.

5. The combination with heat supply control means, of means for securing alternating periods of increase and decrease of the heat supply comprising electric circuit means which in one condition causes an increase in the heat supply and in another condition causes a decrease in the heat supply, means for periodically effecting the required alterations of said circuit means comprising a time-controlled rotatable member and a movable member co-operating with said rotatable member to effect the circuit changes, movable temperature-controlled means for effecting movement of said movable member to vary the timing of the circuit alterations, and transmission means acting between said temperature-controlled means and said movable member for varying the effect of the temperature-controlled means on the movement of the movable member comprising a cam having differently designed meridional developments for controlling the movement of said movable member mounted for rotational and axial movement, one of said two movements being temperature-controlled.

6. The combination with heat supply control means, of means for securing alternating periods of increase and decrease of the heat supply comprising electric circuit means which in one condition causes an increase in the heat supply and in another condition causes a decrease in the heat supply, means for periodically effecting the required alterations of said circuit means comprising a time-controlled rotatable member and a lever member co-operating with said rotatable member to effect the circuit changes, and actuating means for moving said lever member, including a transmission element rotatable about its axis and movable longitudinally of its axis, and means responsive to both said rotatable and axial movements for positioning said lever member upon the surface of said rotatable element in accordance with the combined effect of both said movements.

7. The combination with heat supply control means, of means for securing alternating periods of increase and decrease of the heat supply comprising electric circuit means which in one condition causes an increase in the heat supply and in another condition causes a decrease in the heat supply, means for periodically effecting the required alterations of said circuit means comprising a plurality of time-controlled rotatable members and a plurality of movable members co-operating with said rotatable members respectively to effect said circuit alterations, common temperature controlled means for controlling the movement of said movable members, and means for periodically rendering one of said rotatable members ineffective to alter said circuit means.

8. The combination with heat supply control means, of means for securing alternating periods of increase and decrease of the heat supply comprising electric circuit means which in one condition causes an increase in the heat supply and in another condition causes a decrease in the heat supply, means for periodically effecting the required alterations of said circuit means comprising a plurality of time-controlled rotatable members and a plurality of movable members co-operating with said rotatable members respectively to effect said circuit alterations, means for individually varying the action of any of the movable members, common temperature-controlled means for controlling the movement of said movable members, and means for periodically rendering one of said rotatable members ineffective to alter said circuit means.

9. A temperature control apparatus comprising heating means, a rotatable chronometric member for causing alternate periods of increase and decrease in the heat supply, and means for modifying the relative lengths of said periods comprising a movable controlled member whose position with respect to said rotatable member determines said relative lengths, a thermostatic control member, and transmission means between said control member and controlled member comprising a cam mounted for axial and rotational movement, having a cam surface, the intersections of which with different axial planes have different degrees of angularity with respect to the axis, and a follower cooperating with said cam surface.

10. A temperature control apparatus comprising heating means, a rotatable chronometric member for causing alternate periods of increase and decrease in the heat supply, and means for modifying the relative lengths of said periods comprising a movable controlled member whose position with respect to said rotatable member determines said relative lengths, a thermostatic control member, transmission means between said control member and controlled member comprising a cam mounted for axial and rotational movement, having a cam surface, the intersections of which with different axial planes have different degrees of angularity with respect to the axis, a follower cooperating with said cam surface, and thermostatic means for controlling one of the cam movements.

11. A temperature control apparatus comprising heating means, a rotatable chronometric member for causing alternate periods of increase and decrease in the heat supply, and means for modifying the relative lengths of said periods comprising a movable controlled member whose position with respect to said rotatable member determines said relative lengths, a thermostatic control member, and transmission means between said control member and controlled member comprising a cam mounted for axial and rotational movement, having a cam surface, the intersections of which with different axial planes have different degrees of angularity with respect to the axis, a follower cooperating with said cam surface, and thermostatic means for controlling the axial movement of the cam.

12. A temperature control apparatus comprising heating means, a rotatable chronometric member for causing alternate periods of increase and decrease in the heat supply, and means for modifying the relative lengths of said periods comprising a movable controlled member whose position with respect to said rotatable member determines said relative lengths, a thermostatic control member, transmission means between said control member and controlled member comprising a cam mounted for axial and rotational movement having a cam surface, the intersections of which surface with a plane perpendicular to the axis is a spiral, and a follower cooperating with said cam surface.

13. In a heat control system for supplying heat to a space, heat supply controlling means, chronometric means for operating said controlling means to supply heat to said system at one rate during one period of the day, at a different rate during a second period of the day, and at a third rate during a third period of the day, and thermostatic means responsive to temperatures outside said space for varying the rate of heat supply during one of said periods according to outside temperature and also for varying the time of transition from each of said periods of the day to the next succeeding period, according to outside temperature.

14. In a heat control system for transferring heat with respect to a space, heat transfer controlling means, chronometric means for placing said controlling means in condition to transfer heat with respect to said space at one rate during one period of the day, at a different rate during a second period of the day, and at a third rate during a third period of the day, and thermostatic means responsive to temperature outside said space for varying the rate of heat transfer during one of said periods and for varying the time of transition from one of said conditions to another condition in accordance with outside temperature.

15. In a heat control system for transferring heat with respect to a space, heat transfer controlling means, chronometric means for placing said controlling means in condition to transfer heat with respect to said space at one rate during a day-on period, at a different rate during a night-off period, and at a third rate during a morning building-up period, and thermostatic means responsive to temperature outside said space for varying the rate of heat transfer during one of said periods and for varying the length of said morning building-up period, in accordance with outside temperature.

16. In a heat control system for transferring heat with respect to a space, heat transfer controlling means, chronometric means for placing said controlling means in condition to transfer heat with respect to said space at one rate during one period of the day, at a different rate during a second period of the day, and at a third rate during a third period of the day, and thermostatic means responsive to temperature outside said space for varying the rate of heat transfer during one of said periods and for varying the time of transition from one of said conditions to another condition in accordance with outside temperature, said chronometric means including rotatable means provided with a series of elements successively brought into operative position by rotation of said rotatable means for effecting intermittent increase and decrease of the heat transfer.

17. In a heat control system for transferring heat with respect to a space, heat transfer controlling means, chronometric means for placing said controlling means in condition to transfer heat with respect to said space at one rate during one period of the day, and at a different rate during a second period of the day, and thermostatic means responsive to temperature outside said space for varying the rate of heat transfer during one of said periods and for varying the time of transition from one of said conditions to another condition, in accordance with outside temperature.

HENRY T. KUCERA.